(12) United States Patent
Novacek

(10) Patent No.: US 8,176,471 B2
(45) Date of Patent: *May 8, 2012

(54) STATIC BINDING OF NODES TO VIRTUAL INSTRUMENTS IN A GRAPHICAL PROGRAM

(75) Inventor: Matthew E. Novacek, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1762 days.

This patent is subject to a terminal disclaimer.

(21) Appl. No.: 11/031,512

(22) Filed: Jan. 7, 2005

(65) Prior Publication Data

US 2005/0155015 A1    Jul. 14, 2005

Related U.S. Application Data

(60) Provisional application No. 60/535,707, filed on Jan. 9, 2004.

(51) Int. Cl.
*G06F 9/44* (2006.01)
(52) U.S. Cl. .......... 717/113; 717/105; 717/109
(58) Field of Classification Search .......... 717/104, 717/105, 110–113, 109
See application file for complete search history.

(56) References Cited

U.S. PATENT DOCUMENTS

| | | | |
|---|---|---|---|
| 5,555,365 A * | 9/1996 | Selby et al. ........... | 715/765 |
| 5,748,963 A * | 5/1998 | Orr ........... | 717/131 |
| 6,049,805 A * | 4/2000 | Drucker et al. ........... | 1/1 |
| 6,064,812 A | 5/2000 | Parthasarathy et al. | |
| 6,064,816 A | 5/2000 | Parthasarathy et al. | |
| 6,102,965 A | 8/2000 | Dye et al. | |
| 6,437,805 B1 * | 8/2002 | Sojoodi et al. ........... | 715/763 |
| 6,526,566 B1 | 2/2003 | Austin | |
| 6,971,065 B2 | 11/2005 | Austin | |
| 6,976,222 B2 | 12/2005 | Sojoodi et al. | |
| 2001/0020291 A1 * | 9/2001 | Kudukoli et al. ........... | 717/1 |
| 2002/0089538 A1 * | 7/2002 | Wenzel et al. ........... | 345/763 |
| 2002/0100017 A1 * | 7/2002 | Grier et al. ........... | 717/120 |
| 2003/0172369 A1 * | 9/2003 | Kodosky et al. ........... | 717/113 |
| 2003/0237026 A1 * | 12/2003 | Petersen et al. ........... | 714/38 |
| 2005/0155014 A1 | 7/2005 | Andrade et al. | |

OTHER PUBLICATIONS

Ross (The Handbook of Software for Engineers and Scientists, 1996 CRC Press, Inc).*

* cited by examiner

*Primary Examiner* — Li Zhen
*Assistant Examiner* — Hang Pan
(74) *Attorney, Agent, or Firm* — Meyertons Hood Kivlin Kowert & Goetzel, P.C.; Jeffrey C. Hood

(57) ABSTRACT

A system and method for creating a graphical program utilizing one or more nodes which are statically bound to one or more virtual instruments (VIs). The system and method for static binding provides a way to interact individually with controls and indicators of a VI running asynchronously, wherein the values read and written are strictly typed to the data type of the control. The overhead of dynamic invocation may be substantially eliminated to allow for greater efficiency.

19 Claims, 26 Drawing Sheets

STATIC BINDING OF NODES TO VIRTUAL INSTRUMENTS IN A GRAPHICAL PROGRAM

PRIORITY DATA

This application claims benefit of priority of U.S. provisional application Ser. No. 60/535,707, titled "Static Binding of Nodes to Virtual Instruments in a Graphical Program," filed Jan. 9, 2004, whose inventor is Matthew Novacek.

FIELD OF THE INVENTION

The present invention relates to the field of graphical programming, and more particularly to a system and method for creating a graphical program utilizing one or more nodes which are statically bound to one or more respective virtual instruments (VIs).

DESCRIPTION OF THE RELATED ART

Traditionally, high level text-based programming languages have been used by programmers in writing application programs. Many different high level text-based programming languages exist, including BASIC, C, C++, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

To overcome the above shortcomings, various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al disclose a graphical programming environment which enables a user to easily and intuitively create a graphical program. Graphical programming environments such as that disclosed in Kodosky et al can be considered a higher and more intuitive way in which to interact with a computer. A graphically based programming environment can be represented at a level above text-based high level programming languages such as C, Basic, Java, etc.

A user may assemble a graphical program by selecting various icons or nodes which represent desired functionality, and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons which represent devices being controlled.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

SUMMARY

One embodiment of the present invention comprises a system and method for enabling a graphical program to utilize static binding of nodes to virtual instruments (VIs). One embodiment of the present invention comprises a node for use in a graphical program, wherein the node may be statically bound to a VI. An embodiment of the invention also comprises a system and method for creating a graphical program utilizing one or more nodes which may be statically bound to VIs. The graphical program may include a plurality of interconnected nodes that visually indicate functionality of the graphical program. The graphical program may have one or more of a data flow, control flow, and/or execution flow representation.

The system and method for static binding described herein provides a way to interact individually with controls and indicators of a VI running asynchronously, wherein the values read and written may be strictly typed to the data type of the control. Using this system and method, the overhead of dynamic invocation may be substantially eliminated to allow for greater efficiency.

In one embodiment, a system and method for strict VI reference may be useful in communicating with a programmable hardware element (e.g., an FPGA), where the overhead of dynamic calls in relation to the number of parameters passed in fast control loops would represent a significant overhead. Typically, programmable hardware element VIs have more controls and indicators than supported by a connector pane, thereby obstructing the use of a call by reference node.

In one embodiment, the strict VI reference may be used in a manner that is similar to the typical VI reference. In one embodiment, a node is placed in a diagram to open the reference However, configuration takes place from the node's context menu and associated dialogs, rather than from wired inputs to the node. This configuration process ensures that the configuration is defined at edit time, rather than at run time, thereby allowing the VI call to be statically bound to the VI. The output of this node includes a reference number (refnum), which is a reference to the VI. The type of the refnum is preferably specific to the VI (as well as other configuration details).

In one embodiment, the platform on which the VI should be opened may also be selected from the open node. Potential platforms may include, for example, the VI reference on the local host machine, a remote machine on the network, or a programmable hardware element (e.g., an FPGA). This platform information may be included in the refnum output of the node for use by other nodes in their configuration.

BRIEF DESCRIPTION OF THE DRAWINGS

A better understanding of the present invention can be obtained when the following detailed description of the preferred embodiment is considered in conjunction with the following drawings, in which.

Figure 1A:
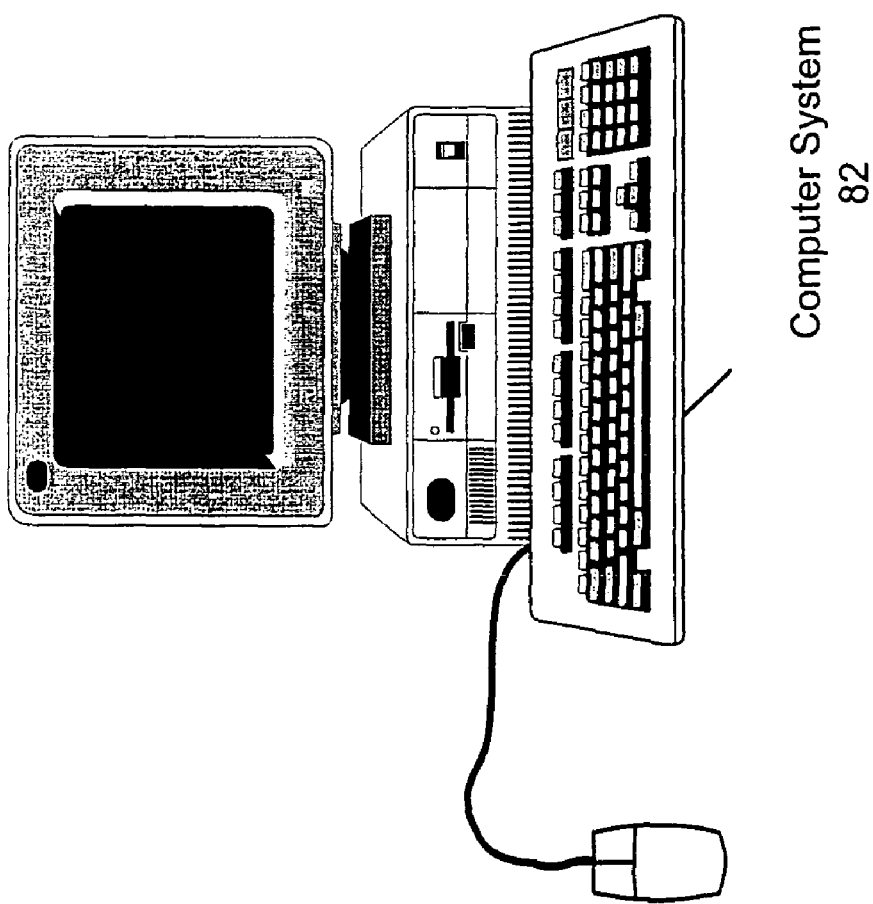
FIG. 1A illustrates a computer system operable to execute a graphical program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1A—Computer System

FIG. 1A illustrates a computer system 82 operable to execute a graphical program configured to provide static binding of nodes to virtual instruments. One embodiment of a method for creating a graphical program operable to provide static binding of nodes to virtual instruments is described below.

As shown in FIG. 1A, the computer system 82 may include a display device operable to display the graphical program as the graphical program is created and/or executed. The display device may also be operable to display a graphical user interface or front panel of the graphical program during execution of the graphical program. The graphical user interface may comprise any type of graphical user interface, e.g., depending on the computing platform.

The computer system 82 may include a memory medium(s) on which one or more computer programs or software components according to one embodiment of the present invention may be stored. For example, the memory medium may store one or more graphical programs which are executable to perform the methods described herein. Also, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

Figure 1B:
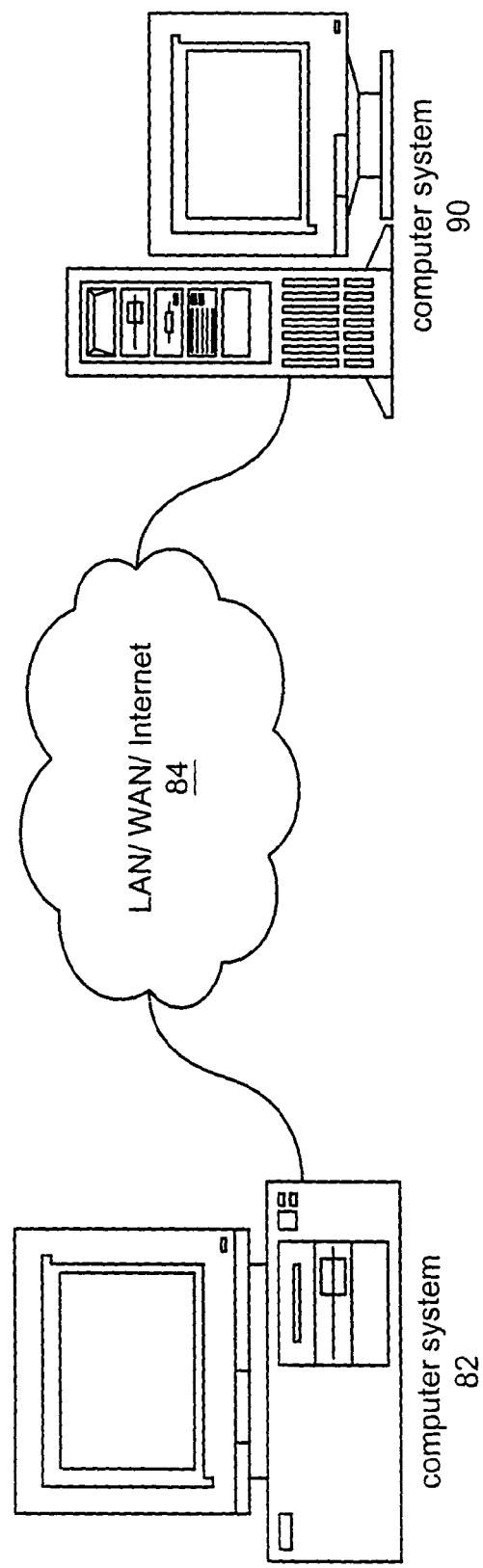
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device 190 connected to the computer system 82. The device 190 may include a programmable hardware element and/or may include a processor and memory medium which may execute a real time operating system. In one embodiment, the graphical program may be downloaded and executed on the device 190. For example, an application development environment with which the graphical program is associated may provide support for downloading a graphical program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
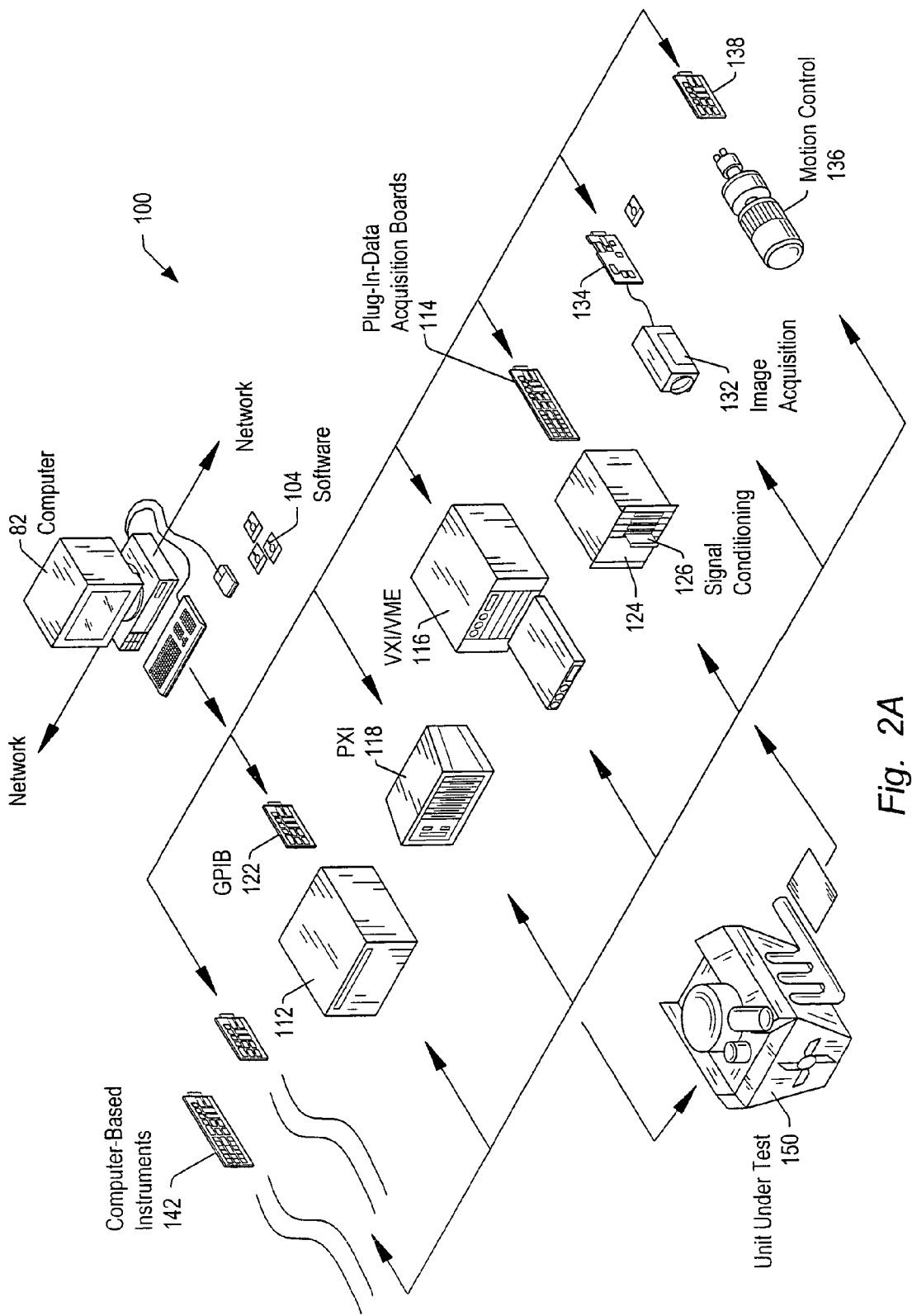
FIG. 2A illustrates an instrumentation control system according to one embodiment of the invention.

FIG. 2A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
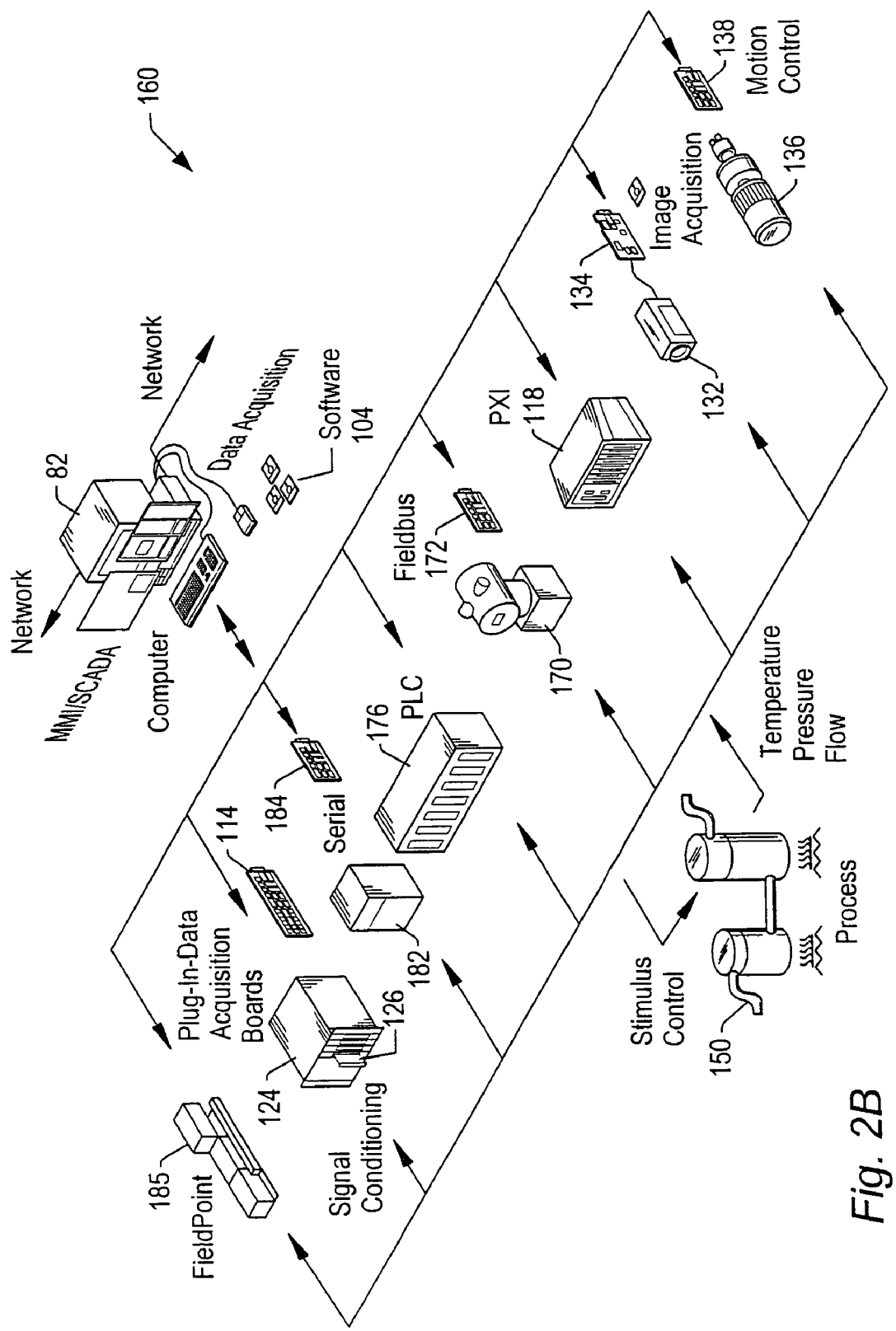
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3A:
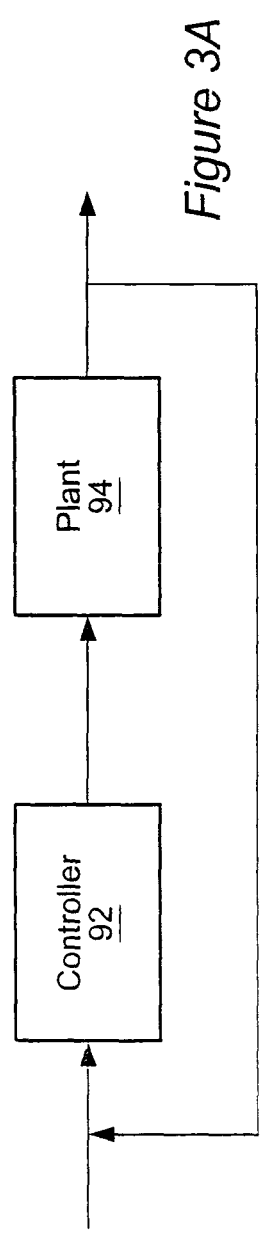
FIG. 3A is a high level block diagram of an exemplary system which may execute or utilize graphical programs.

FIG. 3A is a high level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 3B:
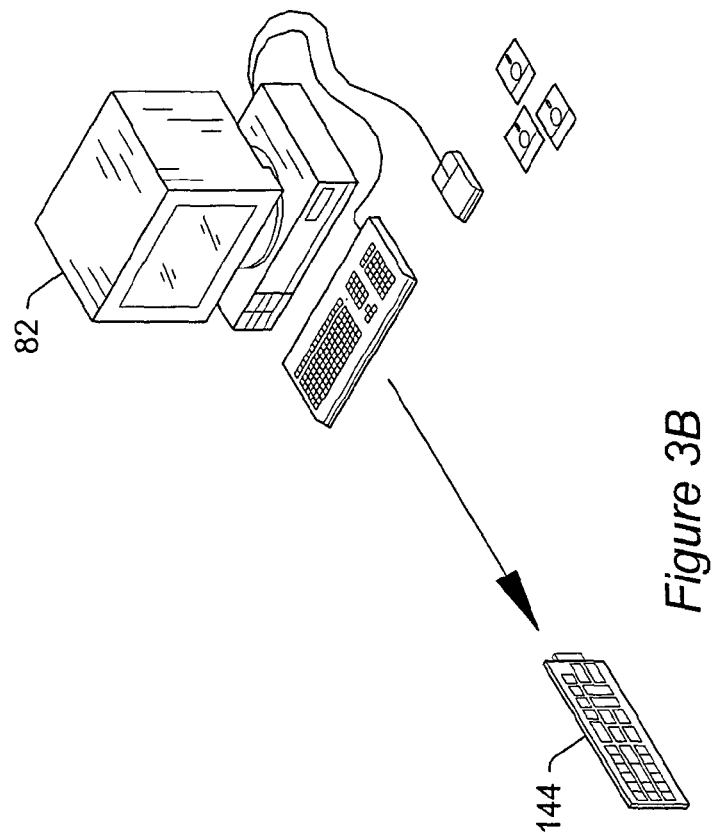
FIG. 3B illustrates an exemplary system which may perform control and/or simulation functions utilizing graphical programs.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments (VIs).

Figure 3C:
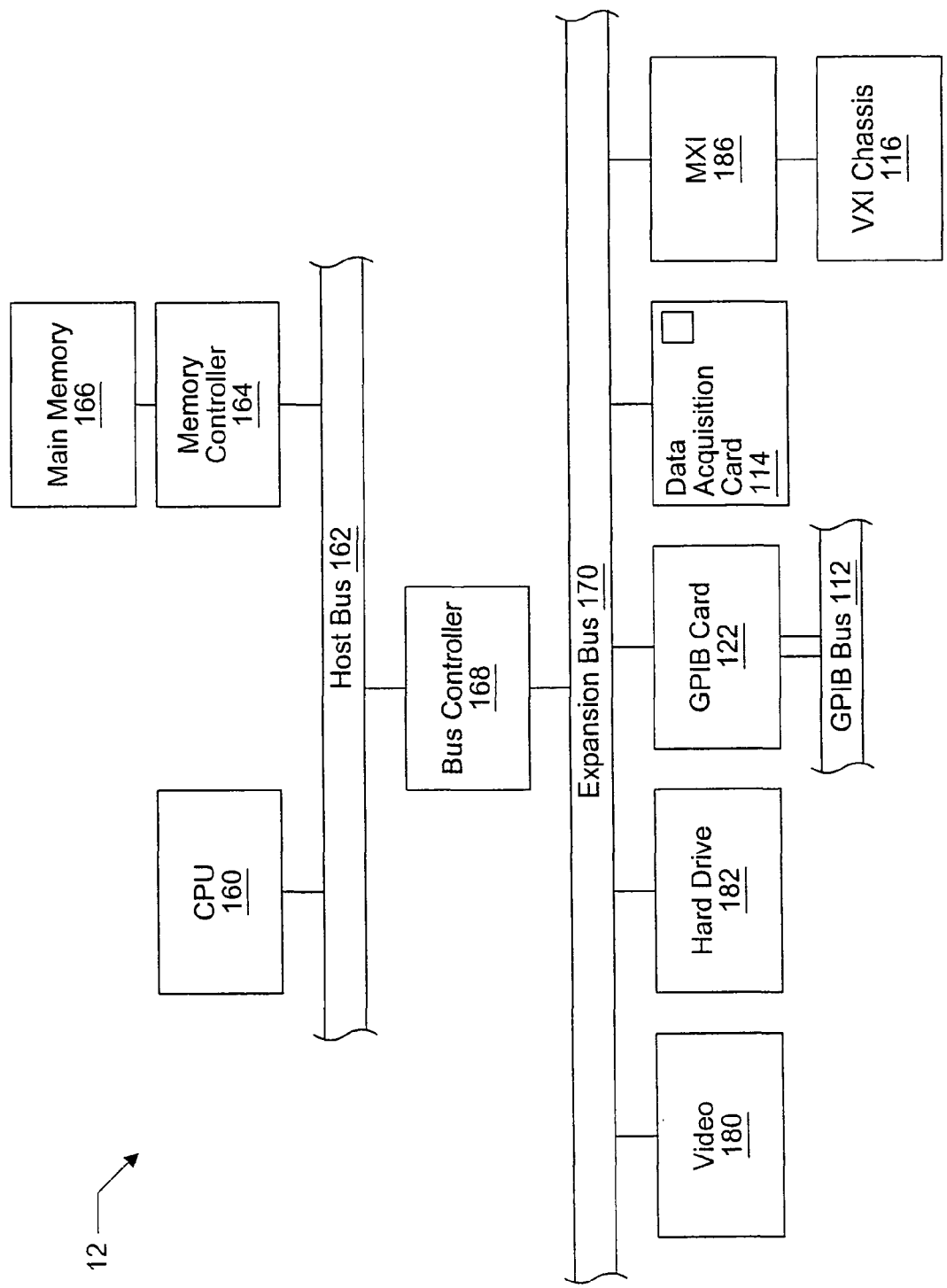
FIG. 3C is an exemplary block diagram of the computer systems of FIGS. 1A, 1B, 2A and 2B and 3B.

FIG. 3C—Computer System Block Diagram

Figure 4:
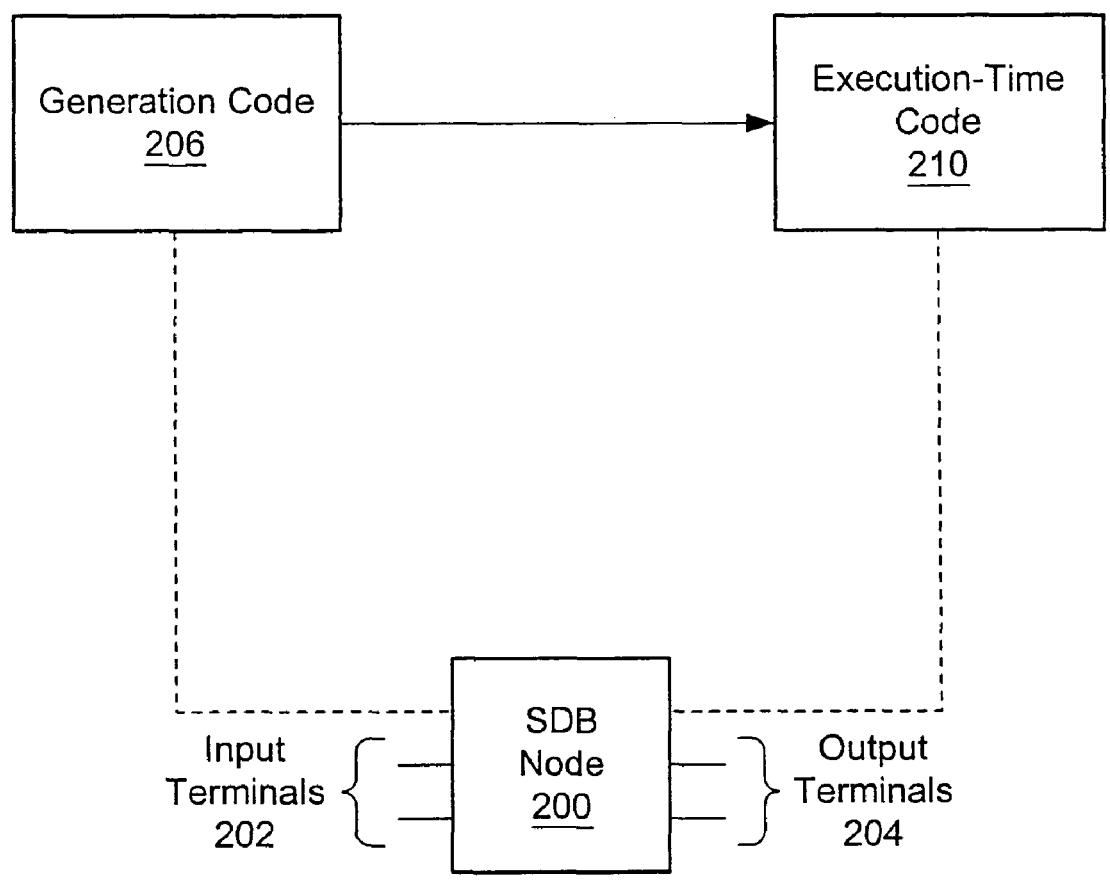
FIGS. 4-8 illustrate various exemplary embodiments of a self-determining behavior (SDB) node.

FIG. 3C is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the graphical program operable to provide static binding of nodes to virtual instruments. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be operable to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

FIGS. 4-8: Self-Determining Behavior (SDB) Node

FIGS. 4-8 illustrate various exemplary embodiments of a self-determining behavior (SDB) node 200. The SDB node 200 may be a node for inclusion in a graphical program, e.g., for connection to other nodes in the graphical program. The SDB node 200 may have zero or more input terminals 202 to which inputs for the SDB node 200 may be connected. For example, the user may connect or wire an output terminal of another node in the graphical program to an input terminal 202 of the SDB node 200, or the user may connect other types of inputs to the input terminals, such as constant values. Also, the SDB node 200 may have zero or more output terminals 204 from which outputs produced or propagated by the SDB node 200 may be provided to other portions of the graphical program. For example, the user may connect or wire an output terminal of the SDB node 200 to an input terminal of another node in the graphical program or to another element of the graphical program.

Each node in a graphical program typically has associated execution-time code which is executed when the graphical program is executed (or which may execute, depending on dynamically determined factors such as conditions evaluated during execution of the graphical program). In other words, a node in a graphical program typically represents some functionality, and the execution-time code associated with the node executes during execution of the graphical program to perform this functionality. For example, as the graphical program is executed, nodes in the graphical program may be scheduled to execute, i.e., the execution-time code of these nodes may be scheduled to execute. The technique used to schedule the execution of the nodes may depend on the particular graphical programming development environment used to create the graphical program or the underlying implementation of the graphical program, such as whether the graphical program utilizes data flow, control flow, and/or execution flow. Block 210 in FIG. 4 illustrates the execution-time code associated with the SDB node 200.

As shown in FIG. 4, the SDB node 200 may also have associated generation code 206. The generation code 206 may be operable to programmatically generate or modify the execution-time code 210. Programmatically generating or modifying the execution-time code 210 may include automatically generating or modifying the execution-time code without receiving user input during the generation or modification process. In one embodiment, when the SDB node 200 is initially displayed or included in a graphical program, the SDB node 200 may not yet have any execution-time code 210 or may have essentially empty or placeholder execution-time code 210. In this case, the generation code 206 may execute to programmatically or automatically generate the execution-time code 210 for the SDB node 200 after the SDB node 200 has been included in the graphical program. Thus, the execution functionality of the SDB node 200 may be determined by the execution-time code 210 generated by the generation code 206. In another embodiment, when the SDB node 200 is initially displayed or included in the graphical program, the SDB node 200 may have default execution-time code 210. In this case, the generation code 206 may execute to programmatically or automatically modify the execution-time code 210 or to re-generate the execution-time code 210.

The generation code 206 may be operable to programmatically generate different types of execution-time code 210 in response to or based on any of various factors. For example, the generated execution-time code 210 may have different functionality depending on these factors. In one embodiment, the actual execution-time code 210 that is generated, or the manner in which existing execution-time code 210 is modified, may depend on input received. For example, the generation may depend on user input received to edit the graphical program and/or user input received to a graphical programming development environment application used to create the graphical program. In other embodiments, the generation of the execution-time code 210 may depend on code generation dependency information, wherein the code generation dependency information may include information of any kind and from any source. Examples of various factors that may influence the generation of the execution-time code 210 are discussed in further detail below.

In various embodiments, the execution-time code 210 programmatically generated or modified by the generation code 206 may include code of any kind, and the code may be associated with the SDB node 200 in any of various ways. In one embodiment, the generated execution-time code 210 may include text-based code. In another embodiment, the generated execution-time code 210 may include graphical code, wherein the graphical code may include a plurality of interconnected nodes which, when displayed, visually indicate functionality of the execution-time code 210. For example, generating the execution-time code 210 may include generating an execution-time block diagram associated with the SDB node 200. Thus, a block diagram specifying execution functionality of the SDB node 200 may be programmatically or automatically generated. The resulting block diagram may be a block diagram much the same as a block diagram manually created by a user. For example, many graphical programming development environments enable a user to create a sub-program node and create a block diagram or graphical code specifying execution functionality of the sub-program node. In one embodiment, the programmatically generated block diagram may itself include one or more instances of an SDB node, e.g., instances of the SDB node that generated the block diagram and/or instances of other SDB nodes.

In one embodiment, the generated execution-time code 210 may subsequently be converted to another form before being executed, such as machine language code. In another embodiment, machine language code may be directly generated.

In one embodiment, the generated execution-time code 210 may be displayed to the user, either automatically or in response to a user request to view the code. In another embodiment, the graphical programming development environment may not allow the user to view the generated execution-time code 210 associated with an SDB node 200.

In various embodiments, the generation code 206 may also include code of any kind, and the code may be associated with the SDB node 200 in any of various ways. In one embodiment, the generation code 206 may include text-based code. In another embodiment, the generation code 206 may include graphical code, wherein the graphical code may include a plurality of interconnected nodes which, when displayed, visually indicate functionality of the generation code 206. For example, the generation code 206 may be included on a block diagram, referred to herein as a node behavior characterization block diagram. Thus, in one embodiment, in addition to having an associated execution-time block diagram, the SDB node 200 may also have a node behavior characterization block diagram. The node behavior characterization block diagram may include the generation code 206, which may be operable to programmatically generate the execution-time block diagram. However, while the execution-time block diagram may execute during execution of the graphical program, the node behavior characterization block diagram may execute at design-time of the graphical program, e.g., as the graphical program is being edited. In one embodiment, the node behavior characterization block diagram may itself include one or more instances of an SDB node.

Figure 5:
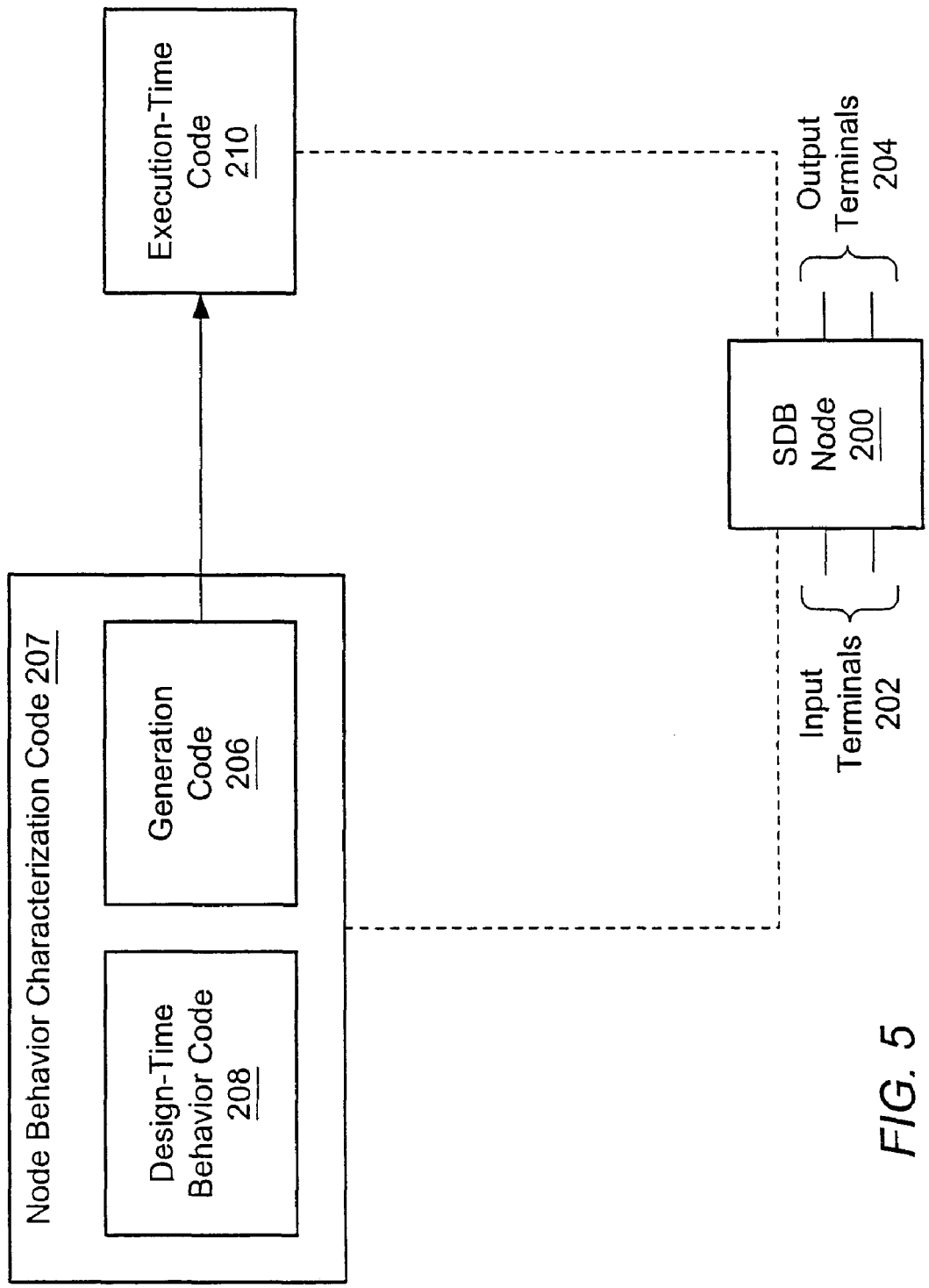

As shown in FIG. 5, in one embodiment, the SDB node 200 may also have design-time behavior code 208. The design-time behavior code 208 may be operable to affect design-time behavior of the SDB node 200. As used herein, the term "design-time" may refer to states when a graphical program including the SDB node 200 is not being executed. For example, design-time may include a state in which the graphical program is currently being edited, such as when the graphical programming development environment is currently displaying a main block diagram of the graphical program and is ready to receive user input specifying edits to the main block diagram. Design-time may also include other states in which the graphical program is not being edited per se. For example, design-time may include a state in which the graphical programming development environment has been launched, but the graphical program itself has not been opened for editing and is not being executed. The term "edit-time" may refer to a state in which the graphical program is currently being edited. For example, edit-time may include a state in which the graphical programming development environment is receiving or is ready to receive user input to edit or create the graphical program.

In various embodiments, the design-time behavior code 208 may affect any of various aspects of the design-time behavior of the SDB node 200. For example, the design-time behavior code 208 may affect a user's experience of interacting with the SDB node 200 when editing the graphical program. The design-time behavior code 208 may execute in response to any of various conditions or events. In one embodiment, the design-time behavior code 208 may execute in response to user input received, such as user input to edit the graphical program. Various examples of actions which may be performed by the design-time behavior code 208 and conditions which may cause the design-time behavior code 208 to execute are described below.

Similarly as described above with respect to the generation code 206, the design-time behavior code 208 may include any of various types of code, such as graphical code and/or text-based code. Also, in various implementations, the design-time behavior code 208 may be associated with the SDB node 200 in any of various ways.

As shown in FIG. 5, in one embodiment the design-time behavior code 208 may be packaged together with the generation code 206. In this case, the design-time behavior code 208 and the generation code 206 may together be referred to as node behavior characterization code 207. For example, in one embodiment the design-time behavior code 208 may include graphical code, and the generation code 206 may include graphical code, and both the design-time behavior graphical code and the execution-time generation graphical code may be included in a common node behavior characterization block diagram. In another embodiment, the design-time behavior code 208 and the generation code 206 may each include text-based code that is packaged together, such as in a common software component.

Figure 6:
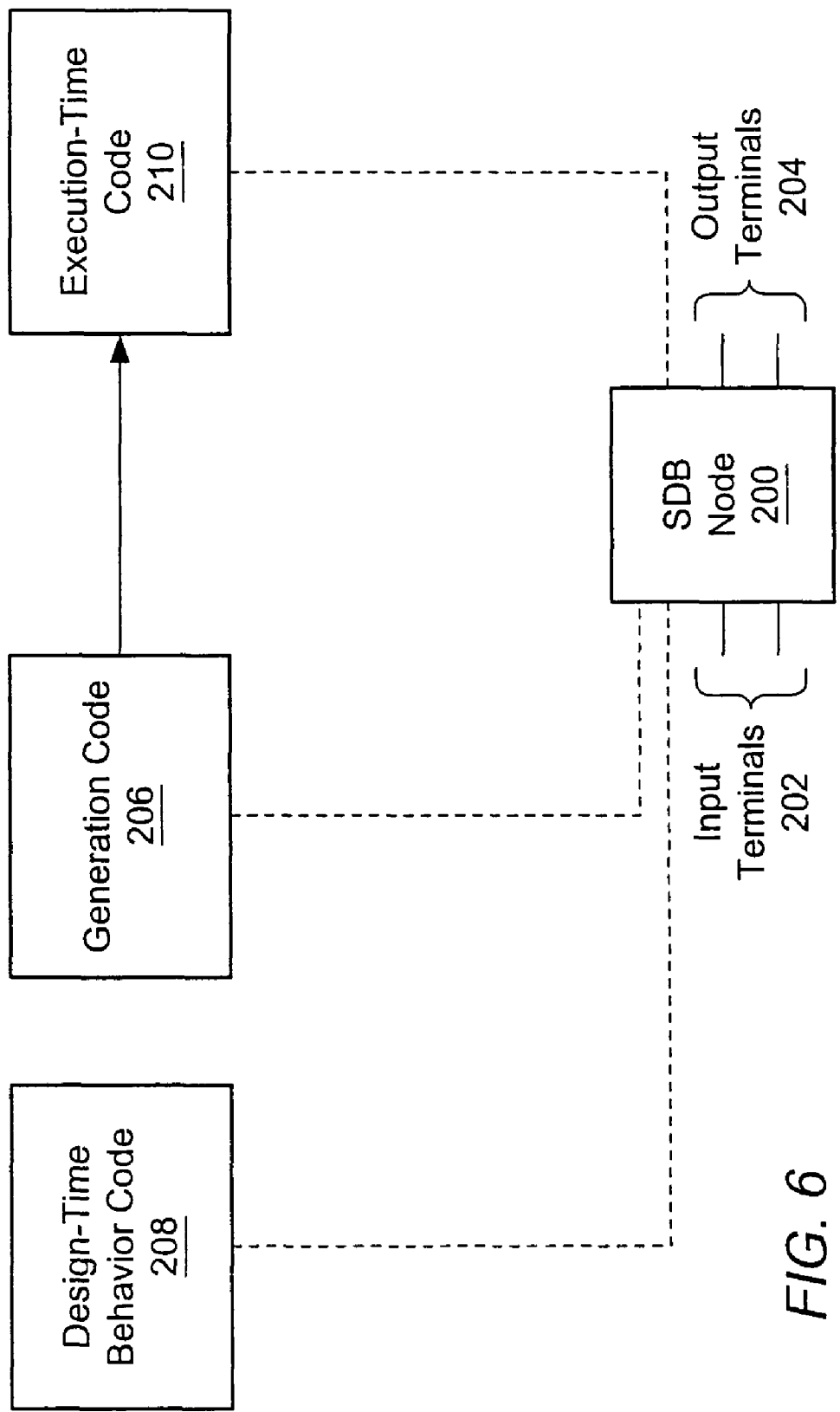

In another embodiment, the design-time behavior code 208 may be largely separate from the generation code 206, as shown in FIG. 6. For example, the design-time behavior code 208 and the generation code 206 may each include graphical code, but the respective graphical code may be located in separate block diagrams. As another example, separate software components may implement the design-time behavior code 208 and the generation code 206, or the respective code may be modularly separate.

It is noted that in another embodiments, the SDB node 200 may have associated generation code 206 but may not have associated design-time behavior code 208, or vice versa.

Figure 7:
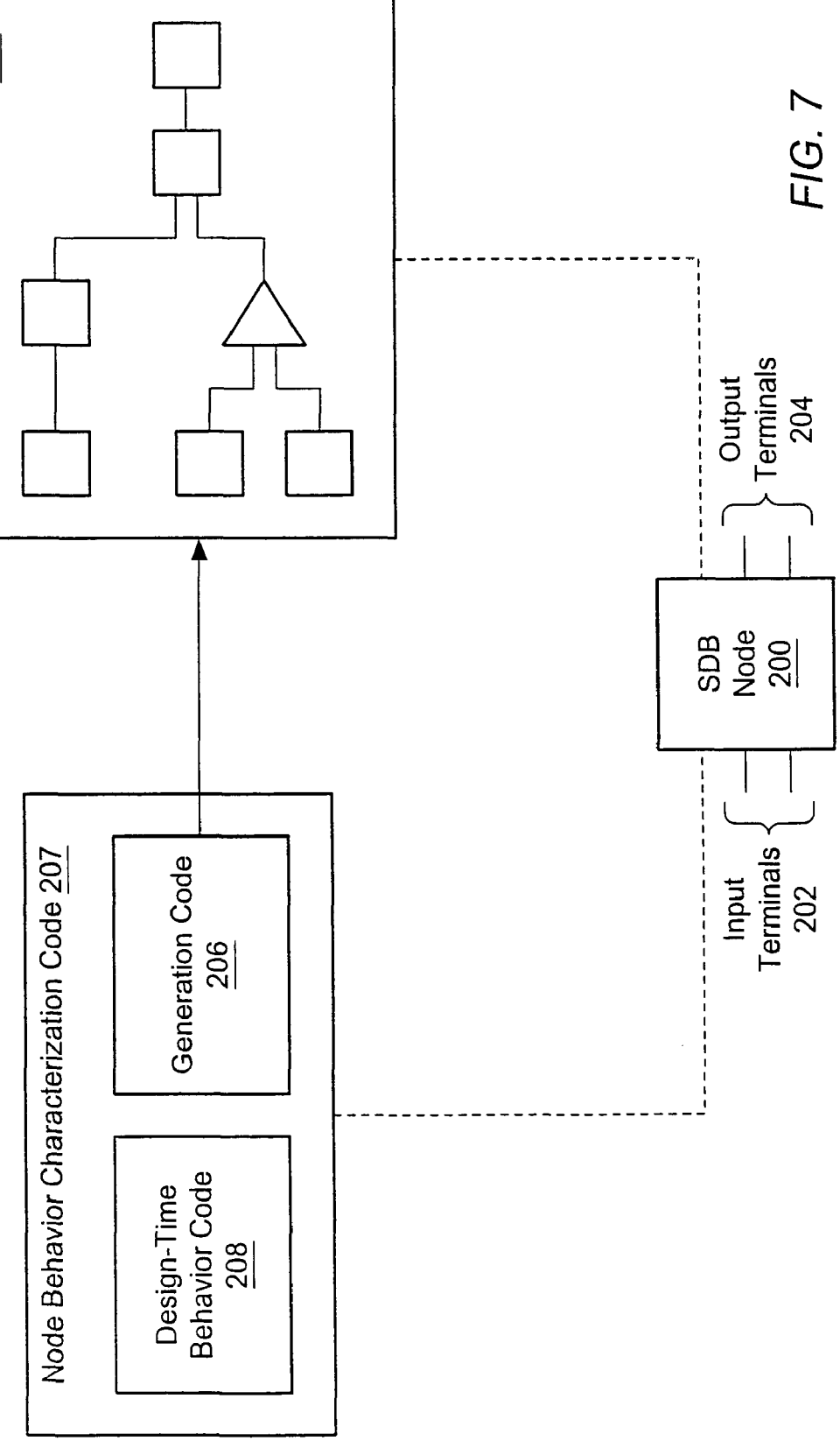

FIG. 7 illustrates an embodiment in which the execution-time code 210 includes graphical code located in an execution-time block diagram 214, similarly as described above. The illustration of the execution-time block diagram 214 shows an arbitrary example of a plurality of interconnected nodes representing the execution-time code 210.

Figure 8:
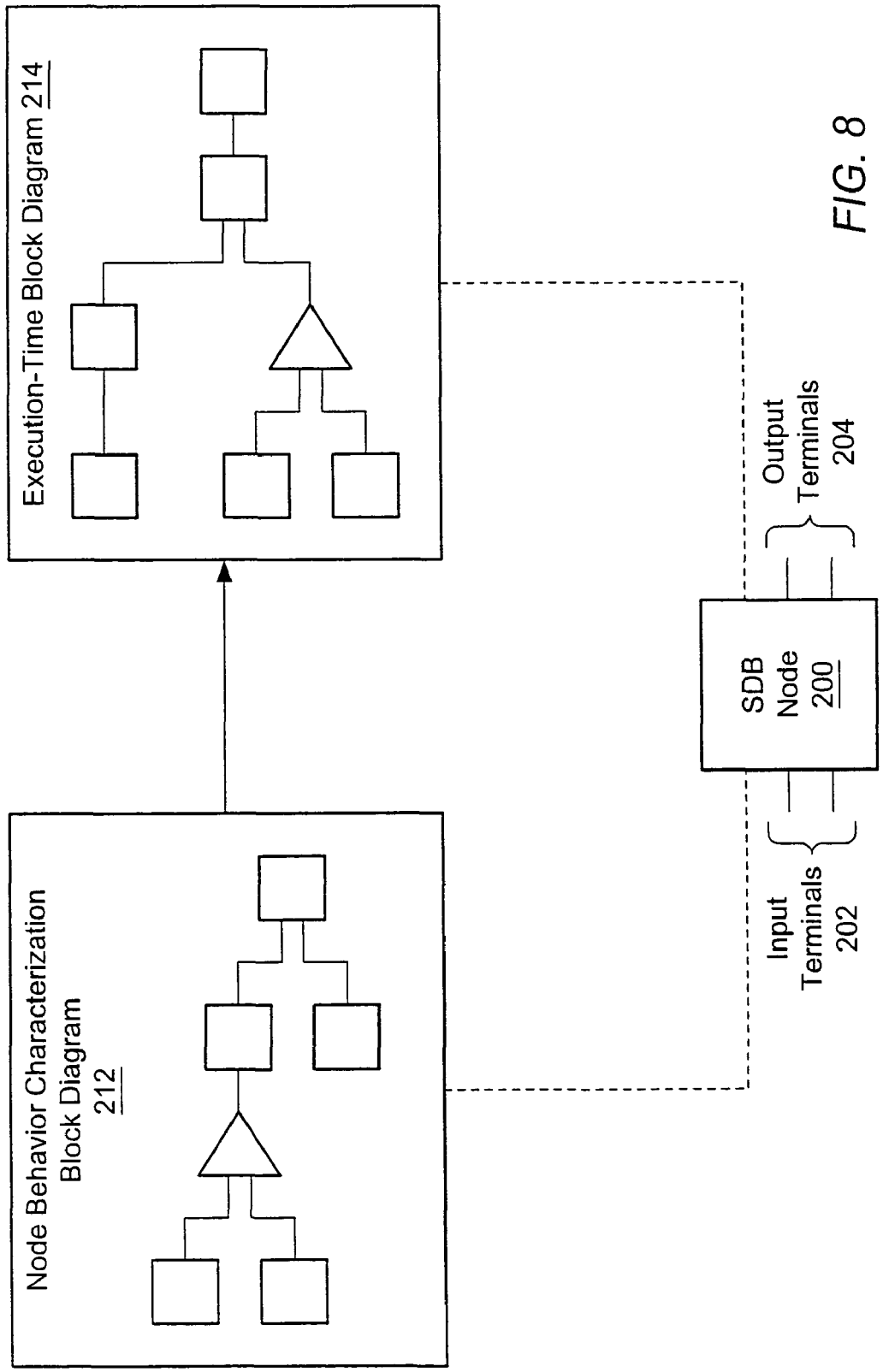

FIG. 8 illustrates an embodiment in which both an execution-time block diagram 214 and a node behavior characterization block diagram 212 are associated with the SDB node 200, similarly as described above. The illustration of the node behavior characterization block diagram 212 shows an arbitrary example of a plurality of interconnected nodes representing the generation code 206 and/or the design-time behavior code 208.

Figure 9:
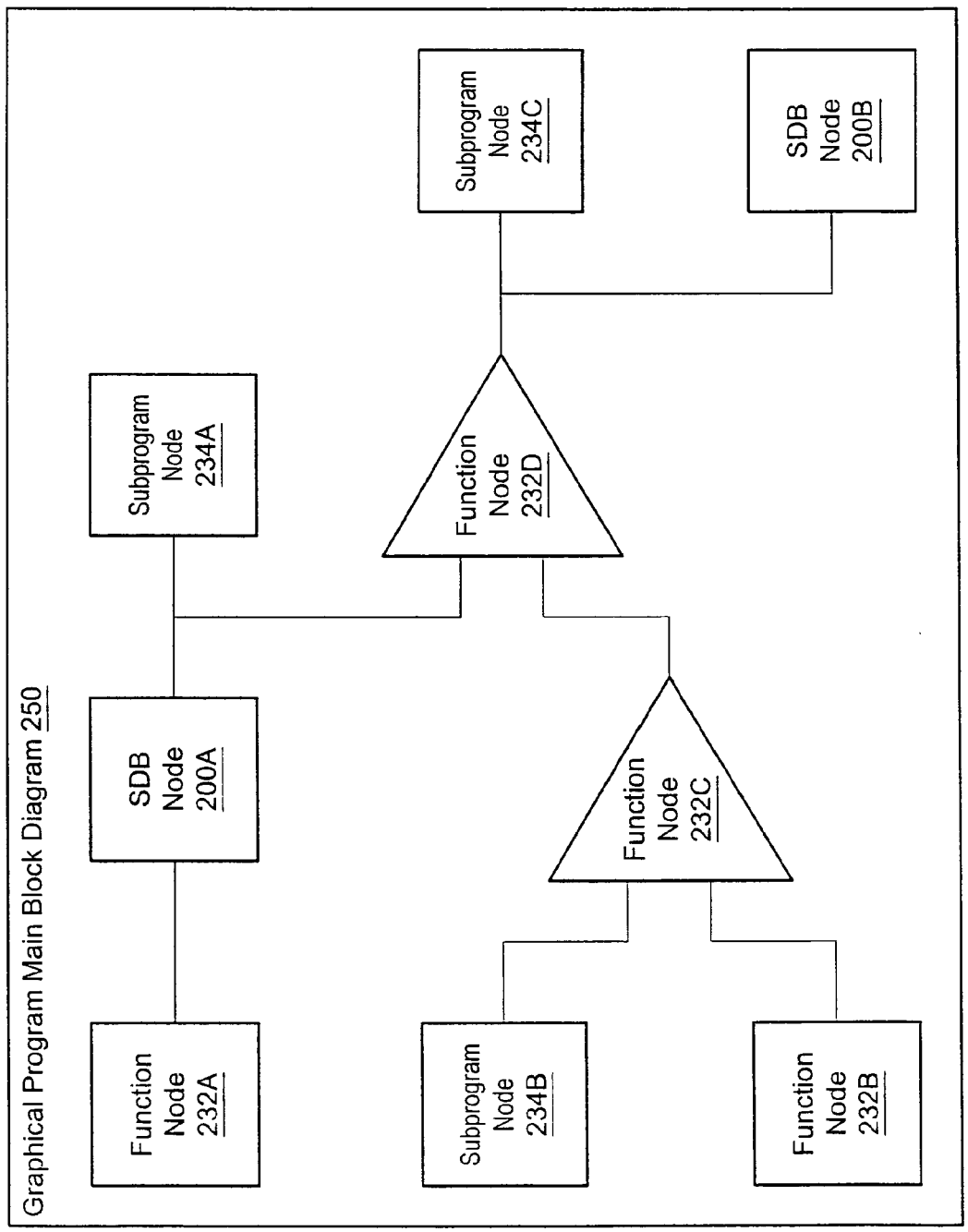
FIG. 9 illustrates an example of a graphical program that includes two self-determining behavior (SDB) nodes.

FIG. 9—SDB Node Included in a Graphical Program

FIG. 9 illustrates an example of a graphical program that includes two self-determining behavior (SDB) nodes 200. For example, the SDB nodes 200 may be included in a main or top-level block diagram of the graphical program. As shown, the graphical program may include various types of nodes such as function nodes 232, subprogram nodes 234, and the SDB nodes 200. In the example of FIG. 9, the particular arrangement of nodes and the interconnections among them is arbitrary and for illustrative purposes. An actual block diagram may be more complex and may include any of various other types of nodes or other elements, such as programmatic structures, e.g., loops, case structures, sequence structures, user interface terminals, etc. Also, the nodes in FIG. 9 are blank and simply labeled with the type of node, but the nodes in an actual block diagram may have an iconic appearance, e.g., to visually indicate the functionality provided by each node.

In various embodiments, any number of SDB nodes 200 may be present in the graphical program. FIG. 9 illustrates two SDB nodes, 200A and 200B. In one embodiment, both nodes of these nodes may be instances of a particular SDB node. In other words, the user may have included the particular SDB node twice in the graphical program. In this case, the SDB node 200A and the SDB node 200B may have associated generation code 206 which is identical. However, since the generation code 206 may be operable to generate execution-time code 210 for the respective nodes differently depending on various factors, the execution-time code 210 associated with each of the two nodes may be different. As one simple example, the generation code 206 may be operable to generate different execution-time code 210 depending on the data type of an input connected to the respective SDB node. SDB node 200A receives an input from function node 232A, and SDB node 200B receives an input from function node 232D. If the outputs of function nodes 232A and 232D have different data types, then different execution-time code 210 may be generated for the respective SDB nodes 200A and 200B.

In another embodiment, the SDB nodes 200A and 200B may not be instances of the same SDB node 200. Any of various kinds of SDB nodes may be made available for inclusion in a graphical program. Thus, the generation code 206 associated with the SDB nodes 200A and 200B may be different. For example, the intended purpose of or type of functionality provided by each of the two SDB nodes may be substantially different.

In addition to the SDB nodes 200, FIG. 9 illustrates function nodes 232 and subprogram nodes 234. The function nodes 232 may be primitive nodes provided by the graphical programming development environment. The function nodes 232 may have associated execution-time code, but may not have associated block diagrams, i.e., the execution-time functionality of the function nodes 232 may be implemented using techniques other than graphical programming techniques.

The subprogram nodes 234, on the other hand, may have associated block diagrams. For example, the graphical programming development environment may enables users to create a custom subprogram node and create a block diagram to specify execution-time functionality of the subprogram node. Also, various subprogram nodes may be provided by the graphical programming development environment itself for inclusion in graphical programs, e.g., these subprogram nodes may come with the graphical programming development environment when it is installed. Thus, there may be a hierarchy of block diagrams in a graphical program, e.g., a main or top-level block diagram, as well as block diagrams of subprogram nodes, which may in turn include other subprogram nodes having block diagrams, etc.

In one embodiment, an SDB node 200 may be included in the block diagram of a subprogram node. For example, instead of illustrating the main or top-level block diagram of a graphical program, FIG. 9 may illustrate the block diagram of a subprogram node.

Figure 10:
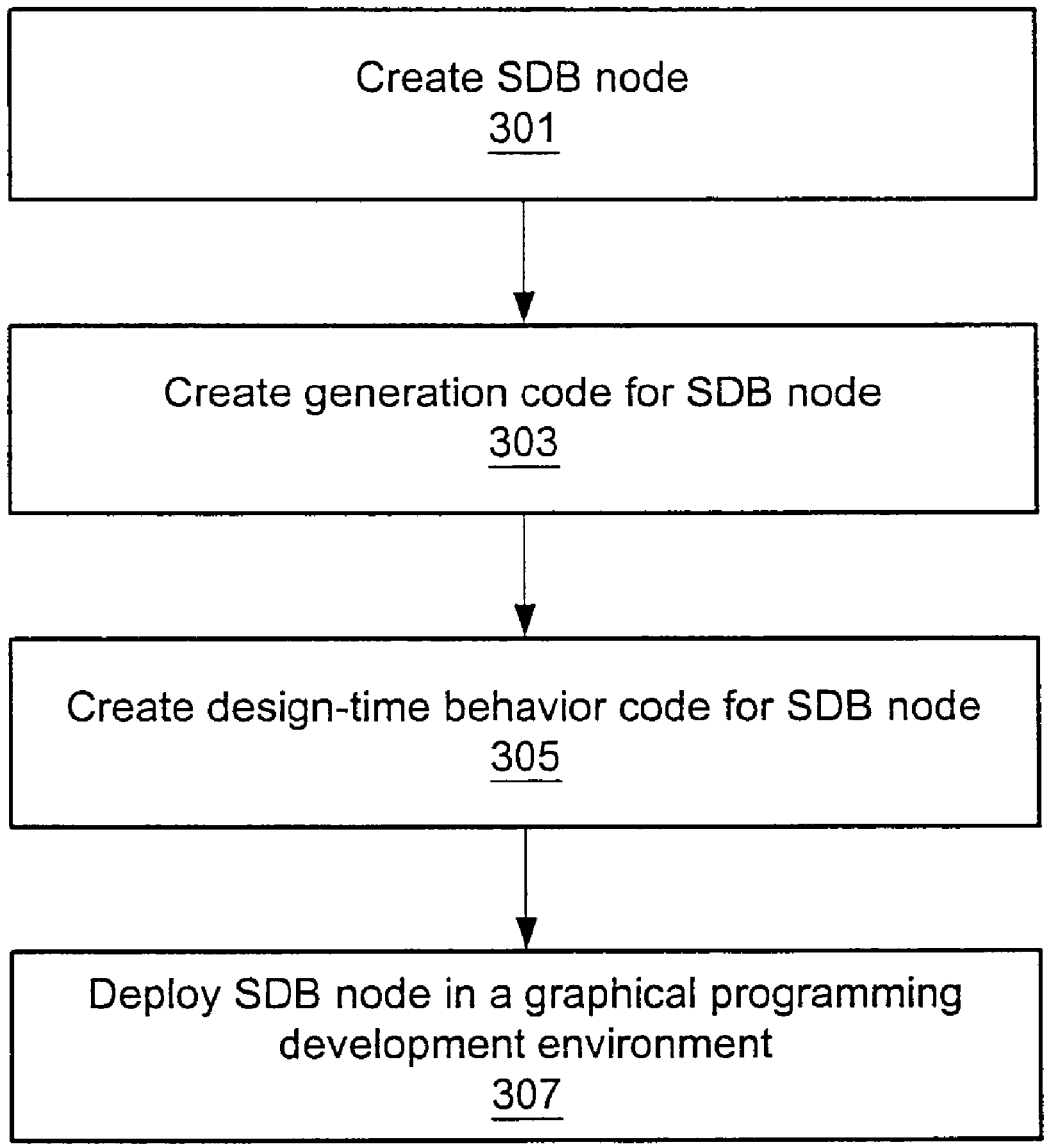
FIG. 10 is a flowchart diagram illustrating one embodiment of a method for creating a self-determining behavior (SDB) node.

FIG. 10—Creating an SDB Node

FIG. 10 is a flowchart diagram illustrating one embodiment of a method for creating a self-determining behavior (SDB) node. It is noted that FIG. 10 illustrates a representative embodiment, and alternative embodiments are contemplated. Also, various steps may be combined, omitted, or performed in different orders, etc.

In 301, the SDB node may be initially created. For example, the user may request a graphical programming development environment to create an initial or default SDB node, e.g., by utilizing a menu command or providing other input to the graphical programming development environment. In response, the graphical programming development environment may create or store initial or default data structures representing the SDB node. The data structures may include a default icon for display when the SDB node is included in a graphical program. The user may later specify another iconic appearance that better indicates the functionality of the SDB node.

In 303, generation code associated with the SDB node may be created, e.g., in response to user input. The user may specify generation code operable to programmatically generate desired execution-time code for the SDB node. As described below, the generation code may be operable to generate the execution-time code in response to or based on various types of input, events, or conditions. Also, the generation code may be operable to determine various types of code generation dependency information that affects the generation of the execution-time code.

As described above, the generation code may include code of any kind, including graphical code, text-based code, or other types of code, and the code may be associated with the SDB node in any of various ways. In one embodiment, a graphical user interface for specifying the generation code may be displayed, and the user may interact with this graphical user interface to specify the generation code. For example, in one embodiment, the generation code may include graphical code located in a block diagram. Thus, for example, a graphical user interface, e.g., a panel or window, for creating the block diagram may be displayed. The user may interact with the graphical user interface to specify the inclusion of various nodes or other elements in the block diagram, specify interconnections among the nodes, configure properties or parameters of the nodes, etc.

In another embodiment, the generation code may include text-based code. Thus, 303 may include creating or filling in one or more functions, methods, or other procedures with text-based code operable to programmatically generate execution-time code for the SDB node when executed.

In 305, design-time behavior code associated with the SDB node may be created, e.g., in response to user input. The user may specify design-time behavior code operable to affect various aspects of design-time behavior of the SDB node. Various examples of design-time behavior are discussed below. The design-time behavior code may be operable to affect design-time behavior of the SDB node in response to or based on various types of input, events, or conditions. In one embodiment, the design-time behavior code may execute in response to user input received, such as user input to edit a graphical program in which the SDB node has been included.

Similarly as described above, the design-time behavior code may include code of any kind, including graphical code, text-based code, or other types of code, and the code may be associated with the SDB node in any of various ways. For example, in one embodiment, the design-time behavior code may include graphical code located in a block diagram. Thus, graphical design-time behavior code may be included in the block diagram. In another embodiment, the design-time behavior code may include text-based code.

As described above, in one embodiment, the design-time behavior code may be packaged together with the generation code. For example, the design-time behavior code and the generation code may each include graphical code located within a common node behavior characterization block diagram. Thus, 303 and 305 may be combined. Also, in one embodiment, the SDB node may not have associated generation code or may not have associated design-time behavior code, and thus 303 or 305 may not be performed. Also, in one embodiment, the generation code and/or the design-time behavior code may be pre-existing before the SDB node is created or may be created using an application other than an application used to create the SDB node. Thus, 303 and/or 305 may comprise supplying a reference to such code.

The initial or default data structures representing the SDB node may be updated to include or reference the created generation code and design-time behavior code. Data structures and/or program instructions representing the SDB node may be stored, e.g., may be persistently stored on a memory medium. Storing the SDB node may include storing the generation code and design-time behavior code with the SDB node. In one embodiment, the generation code and/or the design-time behavior code may be converted to another format, which may also be stored.

In one embodiment, creating the SDB node may also comprise specifying an interface for connecting the SDB node to other nodes in a block diagram, e.g., by specifying one or more input and/or output terminals for the SDB node. During execution of the graphical program, the execution-time code of the SDB node may utilize inputs connected to the input terminals.

As indicated at 307, in one embodiment the created SDB node may be deployed in a graphical programming development environment. Deploying the SDB node in the graphical programming development environment may include enabling the graphical programming development environment to allow users to include the SDB node in graphical programs created using the graphical programming development environment. For example, the SDB node may be created using an application, e.g., a graphical programming development environment application, installed on a first computer system. One or more files representing the SDB node may then be stored on a second computer system (or a memory medium accessible from the second computer system), such that when a graphical programming development environment installed on the second computer system is executed to create or edit a graphical program, the graphical programming development environment allows a user to include the SDB node in the graphical program. For example, the SDB node may appear or be listed in a palette or library of nodes available for inclusion, or the user may be able to select one or more files representing the SDB node to request the SDB node to be included.

Thus, for example, an SDB node may be created by a first user and then deployed in a graphical programming development environment on a second user's computer system. The second user may then create a graphical program that uses the SDB node created by the first user. For example, the first "user" may be the vendor of the second user's graphical programming development environment. Thus, the SDB node may be installed along with the graphical programming development environment on the second user's computer system, or may be deployed in the graphical programming development environment at a later date. Also, the first user may be a third-party developer who creates a library of graphical program nodes to provide additional functionality.

In another embodiment, the same user who creates an SDB node may also create a graphical program that uses the SDB node. Thus, it may not be necessary to perform 307 since the SDB node may already be accessible from the user's graphical programming development environment.

Figure 11:
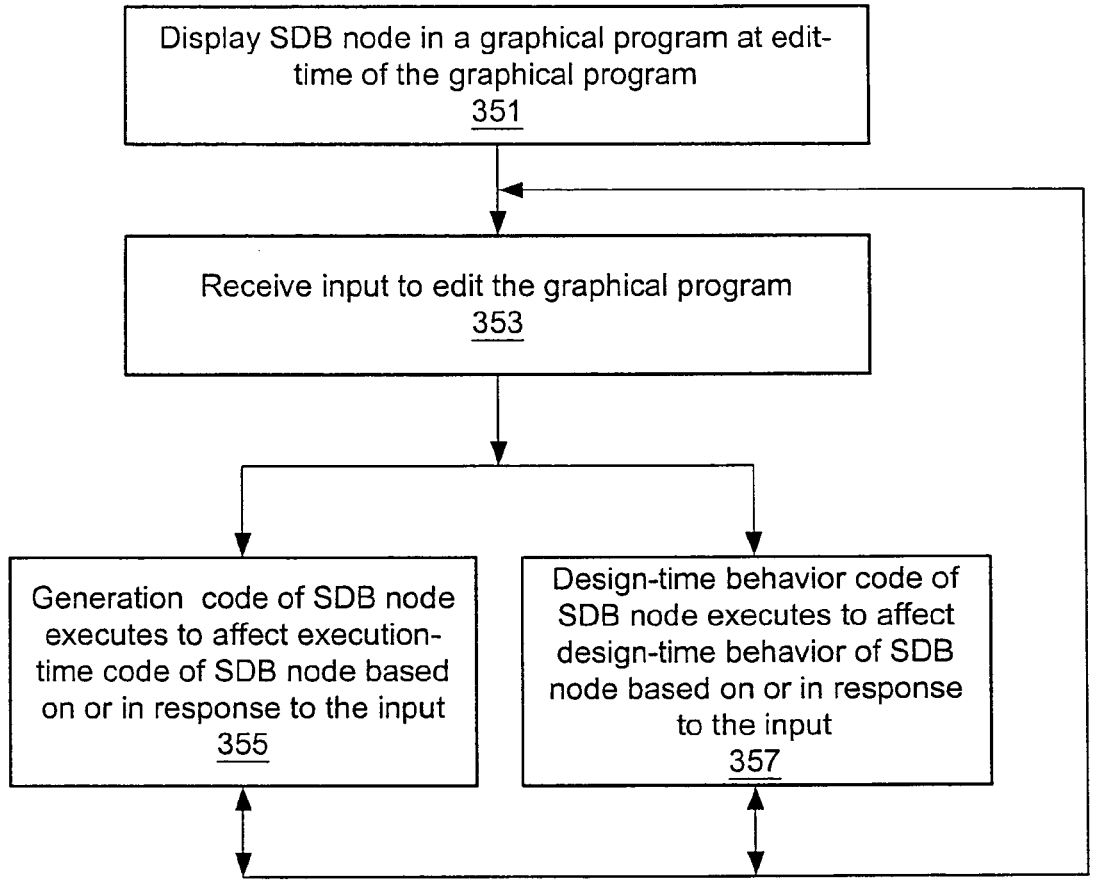
FIG. 11 is a flowchart diagram illustrating one embodiment of a method for creating a graphical program that utilizes a self-determining behavior (SDB) node.

FIG. 11—Creating a Graphical Program that Utilizes an SDB Node

FIG. 11 is a flowchart diagram illustrating one embodiment of a method for creating a graphical program that utilizes a self-determining behavior (SDB) node. It is noted that FIG. 11 illustrates a representative embodiment, and alternative embodiments are contemplated. Also, various steps may be combined, omitted, or performed in different orders.

In 351, an SDB node may be displayed in a graphical program at edit-time of the graphical program, i.e., as the graphical program is being created or edited. For example, the SDB node may be displayed in a block diagram of the graphical program in response to a user requesting to include the SDB node in the block diagram. As described above with reference to FIG. 9, the SDB node may be one of a plurality of nodes in the block diagram. The graphical program or block diagram may be created or assembled by the user arranging on the display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons that visually indicate the functionality of the program. As described above, a user interface or front panel for the graphical program may also be created, e.g., in response to user input.

In 353, input to edit the graphical program may be received. Based on the input received and/or in response to the input received, the generation code of the SDB node may execute in 355 to programmatically generate or affect execution-time code of the SDB node, and/or design-time behavior code of the SDB node may execute in 357 to affect design-time behavior of the SDB node.

The generation of the execution-time code of the SDB node may be performed based on or in response to any of various kinds of input received in 353. In one embodiment, the input may comprise input to a block diagram of the graphical program. For example, the input may be received in the process of creating the plurality of interconnected nodes as described above.

As one example, the input received in 353 may include input specifying the connection of one or more inputs to input terminals of the SDB node. For example, the generation code of the SDB node may be operable to programmatically generate execution-time code based on data types of the inputs. For example, the generation code may enable the SDB node to exhibit polymorphic behavior, as discussed in more detail below. Also, the execution-time code may be programmatically generated based on one or more values of the connected inputs. For example, if a constant integer input value within a first range is connected to the SDB node, first execution-time code may be generated, wherein the first execution-time code has first functionality, and if a constant integer input value within a second range is connected to the SDB node, second execution-time code may be generated, wherein the second execution-time code has second functionality.

As another example, the execution-time code may be generated based on which particular subset of inputs are connected to the SDB node. The SDB node may have a plurality of input terminals, but the user may not be required to connect inputs to all of the terminals. As a simple example, consider an SDB node having a first input terminal, wherein an input connected to the first input terminal may affect execution behavior of the SDB node, or there may be no effect on the execution behavior of the SDB node if no input is connected to the first input terminal. Thus, if no input is connected to the first input terminal, then the generation code may programmatically generate execution-time code for the SDB node that does not include logic for checking the value of an input connected to the first input terminal and responding to the input value. This may result in the execution-time code being smaller and more efficient.

In a case in which the execution-time code is generated based on which particular subset of inputs are connected to the SDB node, it may be difficult to know at edit-time which inputs will eventually be connected to the SDB node. In one embodiment, the generation code may execute each time the subset of connected inputs changes and may interactively re-generate or modify the execution-time code each time based on the connected inputs. In another embodiment, it may be desirable to generate the execution-time code a single time, e.g., after the user has finished editing the graphical program. For example, the generation code associated with the SDB node may be executed to generate the execution-time code when the graphical program is compiled or just prior to execution of the graphical program. Thus, in various embodiments, the generation code may execute to generate execution-time code for the SDB node based on input received to edit the graphical program, but may not execute immediately in response to the input.

As another example, the execution-time code may be generated based on which other nodes the user includes in the graphical program or based on the configuration of other nodes in the graphical program. As a simple example, consider an SDB node designed to analyze data acquired from an acquisition node, wherein the acquisition node is configurable to acquire data from different types of sources. It may be desirable to analyze the data differently, depending on the source type from which the data is acquired. For example, if the user configures the acquisition node to acquire data from a first source type, the generation code of the SDB node may execute to generate first execution-time code having first functionality, and if the user configures the acquisition node to acquire data from a second source type, the generation code of the SDB node may execute to generate second execution-time code having second functionality, wherein the first functionality is different than the second functionality.

In various embodiments, the execution-time code for the SDB node may be generated or modified based on or in response to user input received to configure the SDB node in the graphical program. The SDB node may be able to take on different functionality in the graphical program, depending on configuration user input received. For example, the node may be generally related to a particular functional realm, such as data acquisition, signal analysis, data display, network communications, etc. However, until configuration user input is received for the node, the exact execution-time behavior of the node within the graphical program may be undefined.

In one embodiment, the SDB node may have a configuration user interface for configuring the SDB node, e.g., for specifying desired execution-time functionality of the SDB node. For example, the configuration user interface may include one or more graphical panels or windows. The configuration user interface may comprise information useable in guiding the user to specify desired functionality for the SDB node. The SDB node may be configured to perform a variety of functions within the graphical program, depending on user input received to the configuration user interface. As noted above, the node may be generally related to a particular functional realm, such as data acquisition, signal analysis, data display, etc. Thus, the configuration user interface may display information related to the particular functional realm. For example, for an SDB node related to network communications, the configuration user interface may include GUI controls for specifying a data source or target to which to connect when the SDB node is executed, specify a connection protocol to use, etc.

Thus, in one embodiment, creating the SDB node as described above may also include creating a configuration user interface for the SDB node. After the SDB node has been included in the graphical program, the user may invoke the configuration user interface to configure the SDB node, e.g., by double-clicking on the SDB node, selecting a menu option to request to configure the SDB node, or in any of various other ways.

Thus, in one embodiment an SDB node may be configured to perform a plurality of operations, depending on user input specifying configuration information for the SDB node. The configuration user interface may enable the user to specify one or more desired operations for the SDB node from the plurality of possible operations. However, since the execution-time code associated with the SDB node may be generated programmatically, a "minimal" amount of execution-time code may be generated, i.e., only code necessary to implement the one or more specified operations may be generated. Thus, code corresponding to operations from the plurality of operations that are not among the one or more specified operations may not be included in the graphical program. Associating a minimal amount of execution-time code with a node in a graphical program node in this way may be advantageous in some situations, e.g., by reducing the size of the graphical program.

In various other embodiments, the execution-time code for the SDB node may be generated based on any of various other kinds of input to edit the graphical program. For example, in one embodiment, the generation code may be operable to generate the execution-time code in response to displaying the SDB node in the graphical program in 351. In another embodiment, receiving input to edit the graphical program in 353 may include receiving input to edit a user interface or front panel of the graphical program, and the execution-time code may be programmatically generated based on this input.

Referring again to FIG. 11, 357 illustrates that in one embodiment, design-time behavior code of the SDB node may execute to affect design-time behavior of the SDB node based on or in response to the input received to edit the graphical program. In various embodiments, the design-time behavior code may affect any of various aspects of the design-time behavior of the SDB node. For example, the design-time behavior code may affect a user's experience of interacting with or viewing the SDB node when editing the graphical program. In one embodiment, the design-time behavior code may execute in response to user input received to a block diagram of the graphical program. For example, the user input may be received in the process of creating the plurality of interconnected nodes as described above.

In some embodiments, the user input may be received to the SDB node itself. For example, user input to the SDB node may include: selecting the SDB node; clicking on the SDB node (e.g., left-clicking, right-clicking, or double-clicking); re-sizing the SDB node; moving the SDB node to another location within the block diagram; moving a mouse cursor over the SDB node; etc.

As one example, the design-time behavior code of the SDB node may be operable to display a custom context menu or popup menu for the SDB node, e.g., in response to the user right-clicking on the SDB node. For example, the context menu may include items operable to invoke a user interface to configure the SDB node or checkable Boolean items indicating desired properties of the SDB node. For example, these properties may affect the generation of the execution-time code for the SDB node. The menu items may also allow the user to specify desired edit-time behavior of the SDB node, e.g., whether to dynamically change the input/output terminals of the SDB node as described below.

As another example, the design-time behavior code may be operable to change the number of input/output terminals of the SDB node and/or may affect the terminal names. For example, after the user has configured the SDB node using a configuration user interface such as described above, some of the possible input/output terminals may not be applicable. Thus, the design-time behavior code may execute to dynamically display only relevant terminals. For example, before the user configures the SDB node, a first output terminal may be displayed. If the first output terminal is no longer relevant after the user configures the SDB node, the design-time behavior code may cause this terminal to be hidden. Similarly, if a first input terminal is hidden before the user configures the SDB node, the design-time behavior code may cause the first input terminal to be displayed after the user configures the SDB node if the new configuration requires input to this terminal or makes the terminal relevant.

The terminals of the SDB node may also be affected depending on any of various other kinds of input. For example, if the user connects an input of a first data type to a first input terminal that makes a second input terminal irrelevant, then the second input terminal may be hidden. As another example, if the user connects an input of a first data type to a first input terminal, then a displayed name for the first input terminal or for another terminal may be changed, e.g., to more precisely indicate the purpose of the terminal.

As another example, the design-time behavior code may be operable to change the iconic appearance of the SDB node within the graphical program. For example, the SDB node may have a default icon, and the design-time behavior code may dynamically change the icon depending on how the SDB node has been configured within the graphical program, e.g., depending on input received to a configuration user interface, depending on inputs connected to the SDB node, depending on which nodes the SDB node provides outputs to, etc. As an example, consider a polymorphic SDB node operable to perform a polymorphic operation on two inputs. The icon for the SDB node may be dynamically changed depending on the data types of inputs the user connects to the SDB node, e.g., to more descriptively represent the operation of the SDB node. The new icon may take on any of various shapes or sizes. For example, most nodes in the graphical program may be displayed using an icon of a fixed size, e.g., 32×32 pixels. However, the SDB node may be represented using a larger or smaller icon, as appropriate. Also, an SDB node may be displayed using an icon of any arbitrary shape in addition to square or rectangular icons. For example, the shape and appearance of the icon may change depending on user input.

As another example, the design-time behavior code may be operable to affect the SDB node's behavior in response to the user moving a mouse cursor over the SDB node. For example, the design-time behavior code may display an informative message which may vary depending on the current configuration of the node. As another example, if some of the SDB node's input/output terminals have been hidden as described above, then the design-time behavior code may cause all of the terminals to be temporarily displayed while the mouse cursor is located over the SDB node.

In various embodiments, a user interface or dialog may be displayed for various other purposes besides configuring functionality of the SDB node and may be displayed in response to any of various causes or conditions. As one example, if the user connects an input having an invalid data type to an input terminal of the SDB node, the design-time behavior code may be operable to display a dialog informing the user of the error and informing the user how to correctly use the SDB node.

In one embodiment, both the generation code and the design-time behavior code may execute in response to a given input to edit the graphical program. As one example, in response to receiving input via a configuration user interface to configure the SDB node, the generation code may execute to generate execution-time code based on the specified configuration, and the design-time behavior code may execute to cause a descriptive icon to be displayed based on the specified configuration. In other embodiments, the generation code may execute in response to a given input, but the design-time behavior code may not execute, or vice versa.

Referring again to FIG. 11, the arrows returning from 355 and 357 to 353 indicate that 353, 355, and 357 may be performed repeatedly.

It is noted that FIG. 11 represents one embodiment of a method for creating a graphical program that utilizes an SDB node, and variations of the method are contemplated. For example, in various embodiments, the generation code may be operable to programmatically generate execution-time code for the SDB node based on or in response to any of various other events, conditions, or information besides input received to edit the graphical program. Similarly, the design-time behavior code may also be operable to affect design-time behavior of the SDB node based on or in response to factors other than input received to edit the graphical program.

For example, in one embodiment the method may comprise determining code generation dependency information, wherein the generation code is operable to generate or modify the execution-time code for the SDB node based on or depending on the code generation dependency information. In various embodiments, the code generation dependency information may include information of any kind and from any source. For example, the code generation dependency information may be associated with one or more of: a state of the graphical program; a state of the SDB node or another node in the graphical program; a state of a graphical programming development environment application used to create the graphical program; etc.

As one example, the graphical programming development environment may allow the user to set options regarding a computing platform on which the graphical program is intended to execute. Thus, execution-time code for the SDB node may be generated differently depending on the target platform. For example, if the graphical program will execute on an FPGA device, the execution-time code may be generated in such a way as to facilitate the graphical program to execute efficiently when deployed on the FPGA device.

In other embodiments, the code generation dependency information may include information determined from a source external to the graphical program and external to a graphical programming development environment application used to create the graphical program. For example, the code generation dependency information may be received from a second application external to the graphical programming development environment application, such as another programming environment application or another type of application. As another example, the code generation dependency information may be received from a computer server via a network. For example, the computer server may provide information to allow the execution-time code of the SDB node to be updated periodically, e.g., to extend the functionality of the SDB node or to provide bug fixes.

As another example of code generation dependency information, the generation code may be operable to programmatically generate or modify execution-time code for the SDB node based on the user's history of using the SDB node. For example, when the SDB node was previously used in a first graphical program, the user may have utilized a configuration user interface to configure the SDB node as described above, and execution-time code may have been dynamically generated based on the user's input. The configuration information specified by the user may be stored such that when the user later includes the SDB node in a second graphical program, the SDB node is automatically configured as in the first graphical program, and execution-time code for the SDB node in the second graphical program may be programmatically generated identically as in the first graphical program. Also, separate history information may be maintained for different users, e.g., so that the SDB node may behave differently when different users are creating graphical programs.

Also, in one embodiment the generation of the execution-time code may depend on input received from other sources besides a user. For example, the above-incorporated patent application titled, "System and Method for Programmatically Generating a Graphical Program in Response to Program Information" discloses a method in which a client application may programmatically specify the creation of a graphical program. Thus, for example, a server application may programmatically create the graphical program based on input received from the client application. Where the client application specifies the inclusion of an SDB node in the graphical program, the execution-time code for the SDB node may be dynamically generated based on other information specified by the client application, such as other nodes specified for inclusion in the graphical program, data types of inputs specified for connection to the SDB node's input terminals, etc.

The design-time behavior code may also execute in response to factors other than input to edit the graphical program. For example, the design-time behavior code may be operable to affect design-time behavior of the SDB node based on design-time behavior information, wherein the design-time behavior information may include information of any kind and from any source. As one example, the design-time behavior information may be received from a second application external to the graphical programming development environment application used to create the graphical program. For example, the user may use an external application to configure hardware devices coupled to the computer system. For example, if a data acquisition (DAQ) device is coupled to the computer system, the user may create various named channels referencing the device. Thus, if the SDB node is designed to perform a DAQ-related function, then the design-time behavior code associated with the SDB node may be operable to determine the channel information and affect design-time behavior of the SDB node in various ways based on the channel information. For example, if the user specifies an invalid channel as an input to the SDB node, the design-time behavior code may be operable to alert the user of this error, e.g., by affecting the appearance of the SDB node or otherwise drawing the user's attention.

In various embodiments, multiple SDB nodes may be included in a graphical program, and the SDB nodes may interact with each other in various ways. As one example, a pair of SDB nodes may perform a function together, and changing one of the SDB nodes may affect the other. For example, if the user utilizes a configuration user interface to re-configure one of the SDB nodes, then the execution-time code for both of the SDB nodes may be re-generated in response.

It is noted that the above examples of the generation code programmatically generating or modifying execution-time code for the SDB node are intended to be exemplary only, and many other possible uses of the generation code are contemplated. Similarly, the above examples of the design-time behavior code affecting behavior of the SDB node are intended to be exemplary only, and many other possible uses of the design-time behavior code are contemplated.

Figure 12:
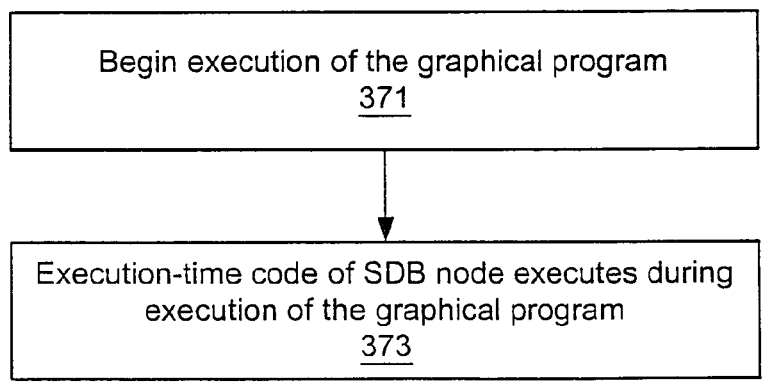
FIG. 12 is a flowchart diagram illustrating one embodiment of a method for executing a graphical program that includes a self-determining behavior (SDB) node.

FIG. 12—Executing a Graphical Program that Includes an SDB Node

FIG. 12 is a flowchart diagram illustrating one embodiment of a method for executing a graphical program that includes a self-determining behavior (SDB) node. It is noted that FIG. 12 illustrates a representative embodiment, and alternative embodiments are contemplated. Also, various steps may be combined, omitted, or performed in different orders.

In 371, the graphical program may begin execution. The graphical program may be executed on any kind of computer system(s) or (re)configurable hardware.

In 373, the execution-time code of the SDB node in the graphical program may be executed, wherein the execution-time code was programmatically generated or modified by generation code associated with the SDB node, as described above with reference to FIG. 11.

Implementation Details

In various embodiments, the SDB nodes and methods described above may be implemented in various ways, e.g., depending on the particular graphical programming development environment used. In one embodiment, an interface may be defined between the graphical programming development environment and the SDB node such that the graphical programming development environment is operable to call into the generation code and/or the design-time behavior code of the SDB node in response to various events or conditions, such as those described above. In various embodiments, the generation code or design-time behavior code may be called at any point during execution of a graphical programming development environment application.

As one example, the interface may define an "input connection" operation such that the graphical programming development environment is operable to call into a specific portion of the generation code and/or the design-time behavior code in response to an input being connected to an input terminal of the SDB node. In various embodiments, the interface may be implemented in any way and may define any kind of event, condition, or other factor that causes execution of a portion of the generation code or design-time behavior code.

The generation code and design-time behavior code may be modularized such that specific portions of the code may be executed in response to particular events or conditions. In various embodiments, the code may be modularized in any way, e.g., depending on a particular implementation, such as whether the code includes graphical code and/or text-based code, etc. For example, the portions of code may be constructed in the form of subprogram nodes, callback functions or methods, cases in a case structure, or in any other way desired.

A few examples of when portions of the generation code or design-time behavior code may be invoked include: when the user first includes an SDB node in a graphical program; when the user moves the SDB node within the graphical program; when the user re-sizes the SDB node; when the user connects an input or output to the SDB node; when the user requests to compile a graphical program that includes the SDB node; when the user clicks on the SDB node; when the user moves a mouse cursor over the SDB node; when a graphical program including the SDB node is initially opened; when the SDB node is painted or drawn on the display; etc. These are just a few examples, and the generation code or design-time behavior code may be invoked in response to any other situation as desired.

In one embodiment, in addition to an interface defining points in which the graphical programming development environment may call into the code of the SDB node, an interface may also define points in which the code of the SDB node may call into the graphical programming development environment. For example, in one embodiment the graphical programming development environment may "listen for" various actions that the generation code or design-time behavior code of the SDB node performs when the code is executed. For example, the graphical programming development environment may listen for a request to display a configuration user interface; a request to generate execution-time code; a request to display a new icon in the block diagram; a request to connect to a server to retrieve information; etc.

As one example, the graphical programming development environment may invoke the generation code of the SDB node when a graphical program including the SDB node is compiled. The generation code may then attempt to dynamically generate execution-time code for the SDB node. However, if a problem with the configuration of the SDB node is discovered during this process, the generation code may request the graphical programming development environment to interrupt the compilation process and display an informative message to the user.

FIGS. 13-16: Example of a Polymorphic SDB Node

In some prior art implementations of polymorphic subprogram nodes, the user was required to create a separate subprogram node to handle each case, i.e., each data type or combination of data types. An SDB node such as described above may eliminate the need to create a separate case for each data type or combination of data types. Instead, the generation code associated with the SDB node may be operable to programmatically generate appropriate execution-time code for whatever combination of data types the user connects to the SDB node. This may enable the subprogram node to be completely polymorphic, e.g., to handle all possible data types or combinations of data types in situations where this was not practical before because the number of polymorphic combinations was too large.

FIGS. 13-16 illustrate an exemplary implementation of a polymorphic addition SDB node, i.e., an SDB node operable to "add" inputs of various data types. For example, if the user connects two inputs having integer data types to the SDB node, the SDB node may be operable to output an integer sum. If the user connects two inputs having string data types to the SDB node, the SDB node may be operable to output a string concatenation of the two strings.

Figure 13:
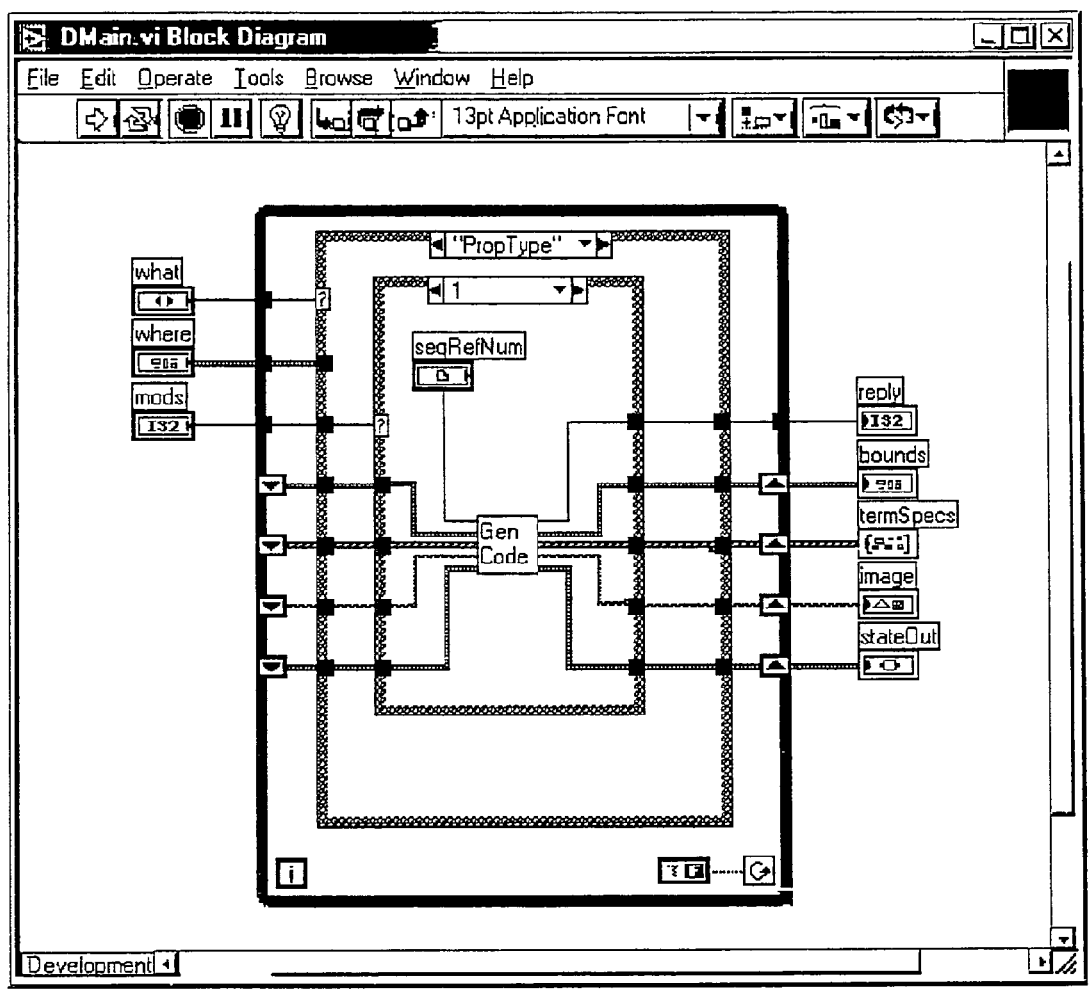
FIGS. 13-16 illustrate an exemplary implementation of a polymorphic addition SDB node.
Figure 14:
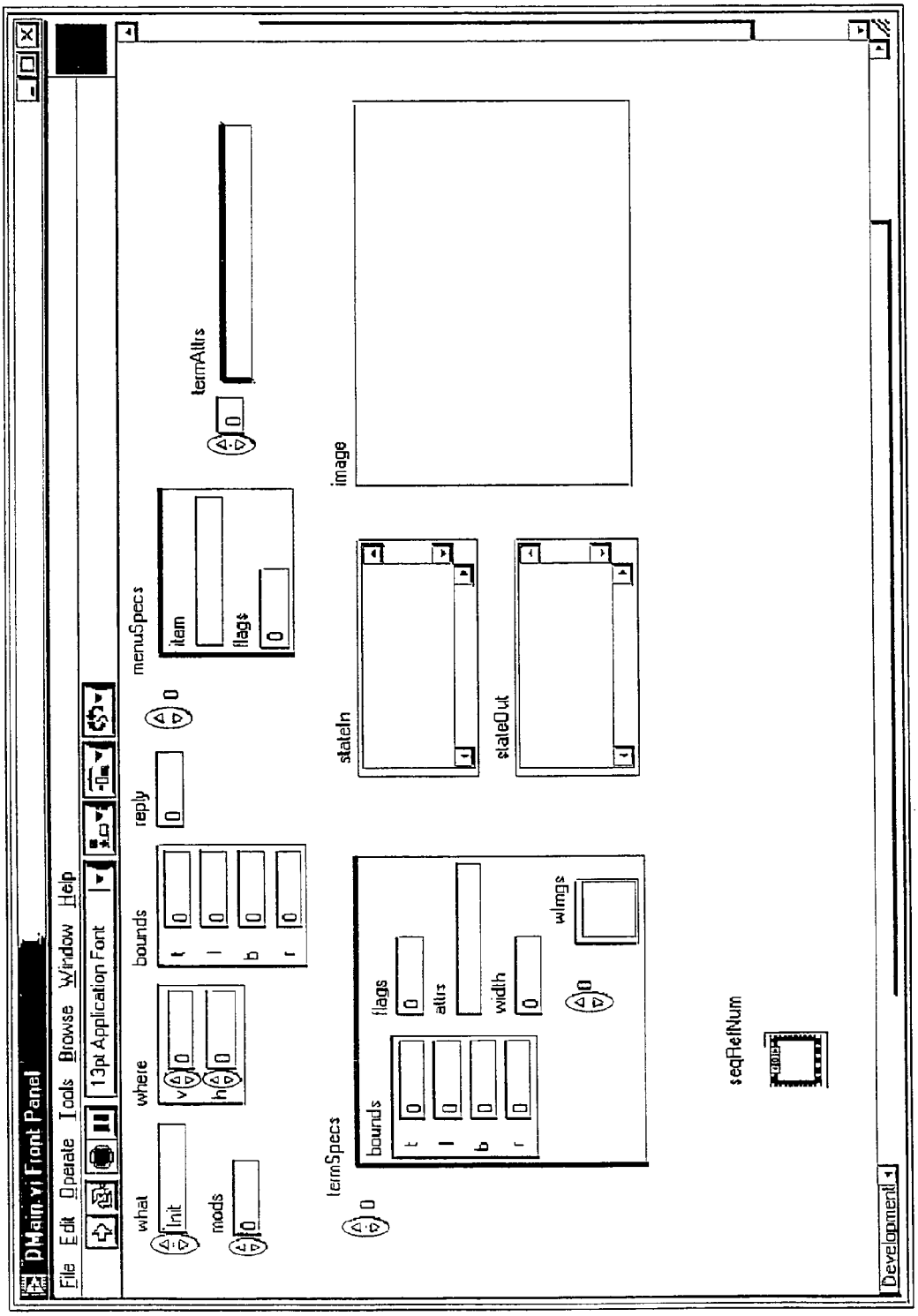

In the example of FIGS. 13-16, the generation code is implemented as a block diagram associated with the SDB node, as shown in FIG. 13. In this example, generation code and design-time behavior code are both included together in the same block diagram. FIG. 13 illustrates a block diagram including two nested case structures. The outermost case structure (labeled "PropType") includes cases that correspond to points at which the generation code/design-time behavior code may be called, i.e., the cases are defined by an interface between the graphical programming development environment and the SDB node such as described above. FIG. 14 illustrates a graphical view of this interface. For example, the input control labeled "what" includes items that match the cases in the outermost case structure shown in FIG. 13.

In FIG. 13, the "PropType" case is shown selected in the outermost case structure. The code for the "PropType" (i.e., type propagation) case may be invoked when the type information is propagated to the SDB node, such as when the user connects inputs to the SDB node. In response, the execution-time code for the SDB node may be programmatically generated, wherein the execution-time code is generated in such a way as to have appropriate functionality depending on the connected data types. For example, as described above, if the user connects two inputs with integer data types to the SDB node, the execution-time code may be generated so as to be operable to output an integer sum; if the user connects two inputs with string data types to the SDB node, the execution-time code may be generated so as to be operable to output a string concatenation; etc.

Figure 15A:
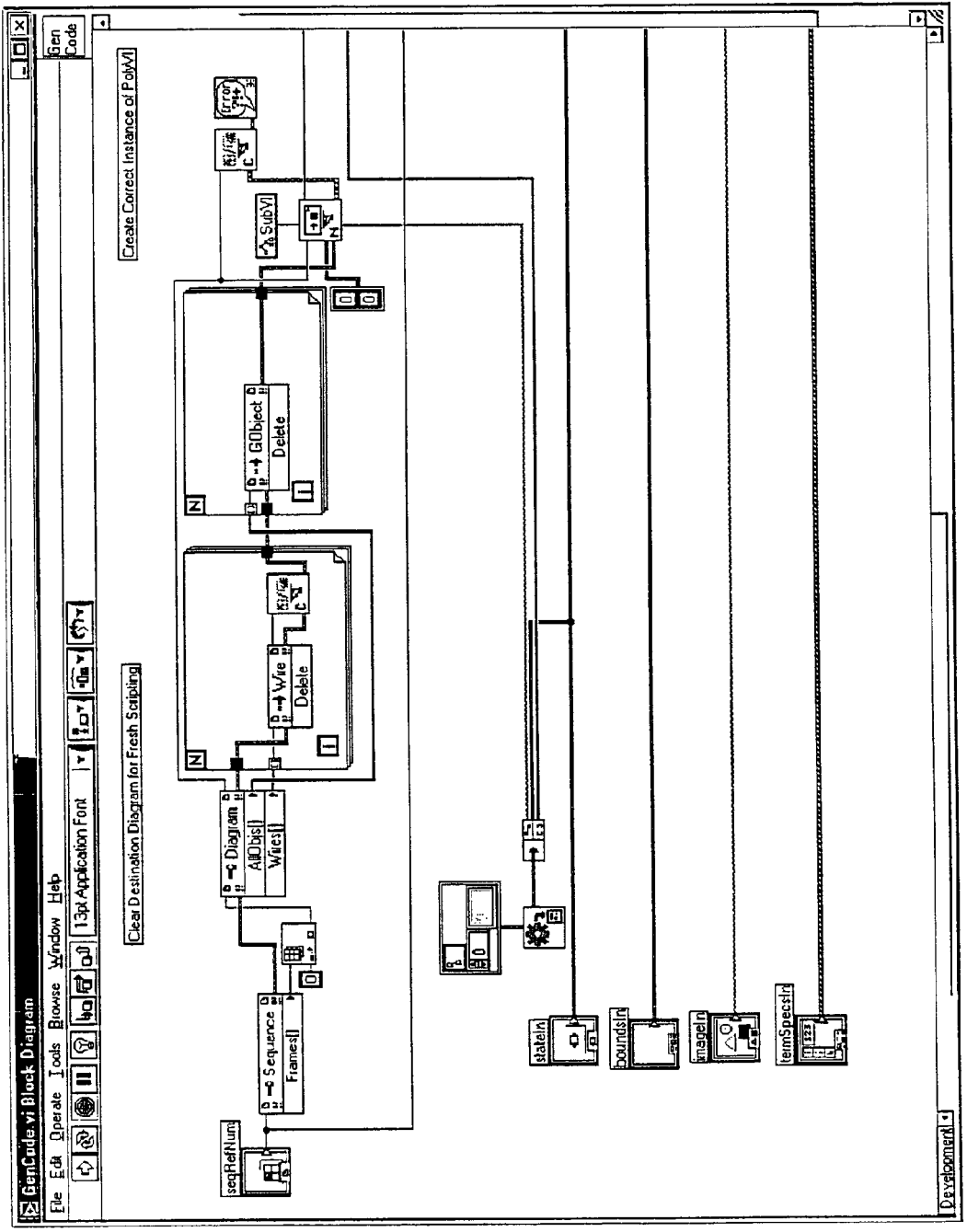
Figure 15B:
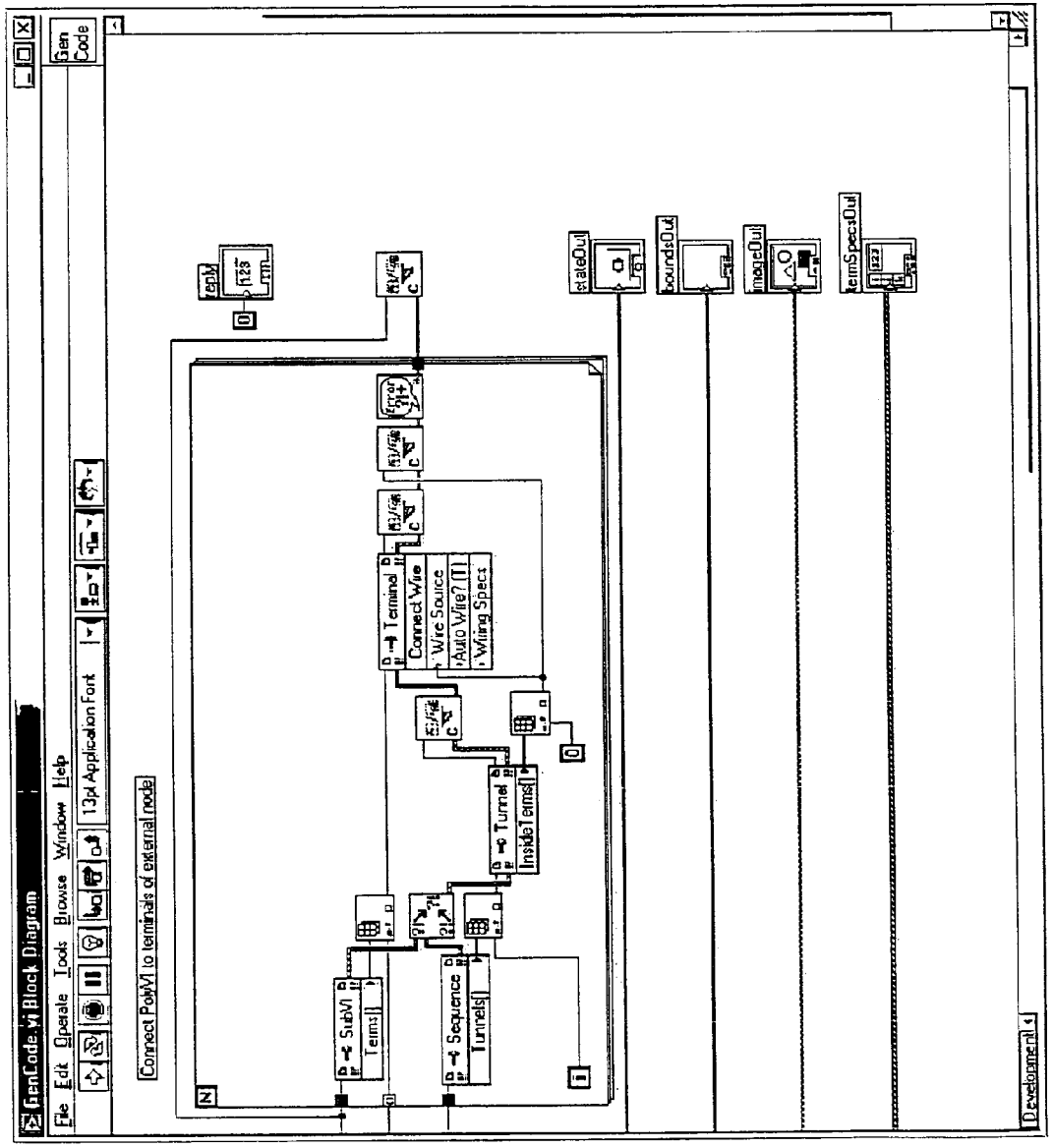

The subprogram node labeled "Gen Code" is operable to perform the actual generation of the execution-time code. FIGS. 15A and 15B illustrate graphical code associated with the "Gen Code" subprogram node.

Figure 16:
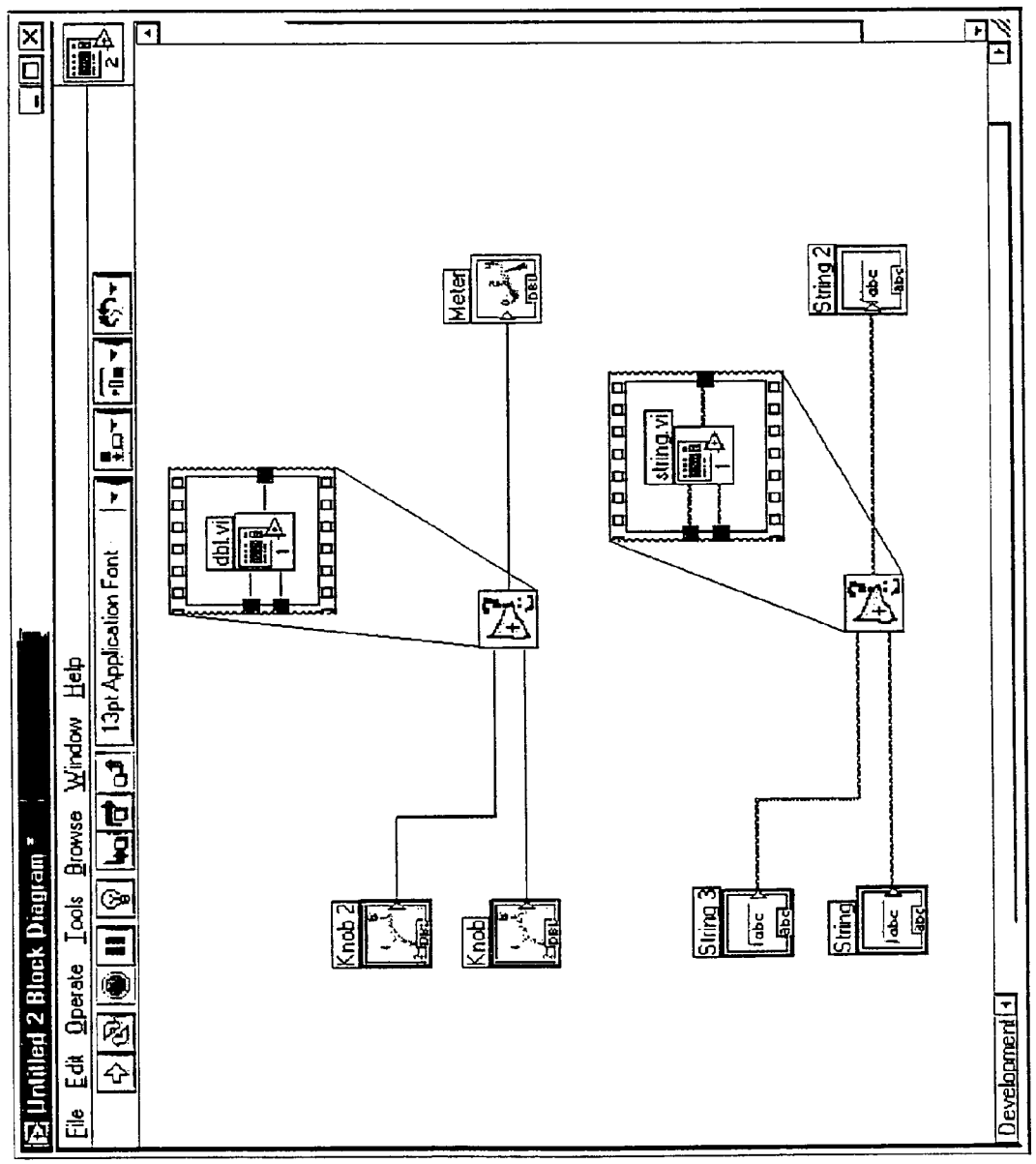

FIG. 16 illustrates an exemplary graphical program that includes two instances of the SDB node described above, e.g., illustrates a main block diagram of the graphical program, such as described above with reference to FIG. 9. Two nodes labeled "Knob" and "Knob 2" which produce outputs having a "double" data type are shown connected to a first instance of the SDB node. In this case, code operable to add the two inputs to produce an output of type "double" was programmatically generated, as represented by the node labeled "dbl.vi". (The node labeled "dbl.vi" is not actually displayed in the graphical program, but is shown in FIG. 16 for illustrative purposes to show what is conceptually "behind" the first instance of the SDB node.) Similarly, two nodes labeled "String" and "String 3" which produce outputs having a "string" data type are shown connected to a second instance of the SDB node. In this case, code operable to concatenate the two inputs to produce an output of type "string" was programmatically generated, as represented by the node labeled "string.vi". (The node labeled "string.vi" is not actually displayed in the graphical program, but is shown in FIG. 16 for illustrative purposes to show what is conceptually "behind" the second instance of the SDB node.)

It is noted that FIGS. 13-16 illustrate one particular example of an SDB node, wherein the SDB node is implemented in one particular way within the LabVIEW graphical programming development environment. However, in various embodiments, an SDB node designed for any purpose may be utilized within any graphical programming development environment and may be implemented in any way, e.g., depending on the requirements of and programming features available within the particular graphical programming development environment.

Figure 17:
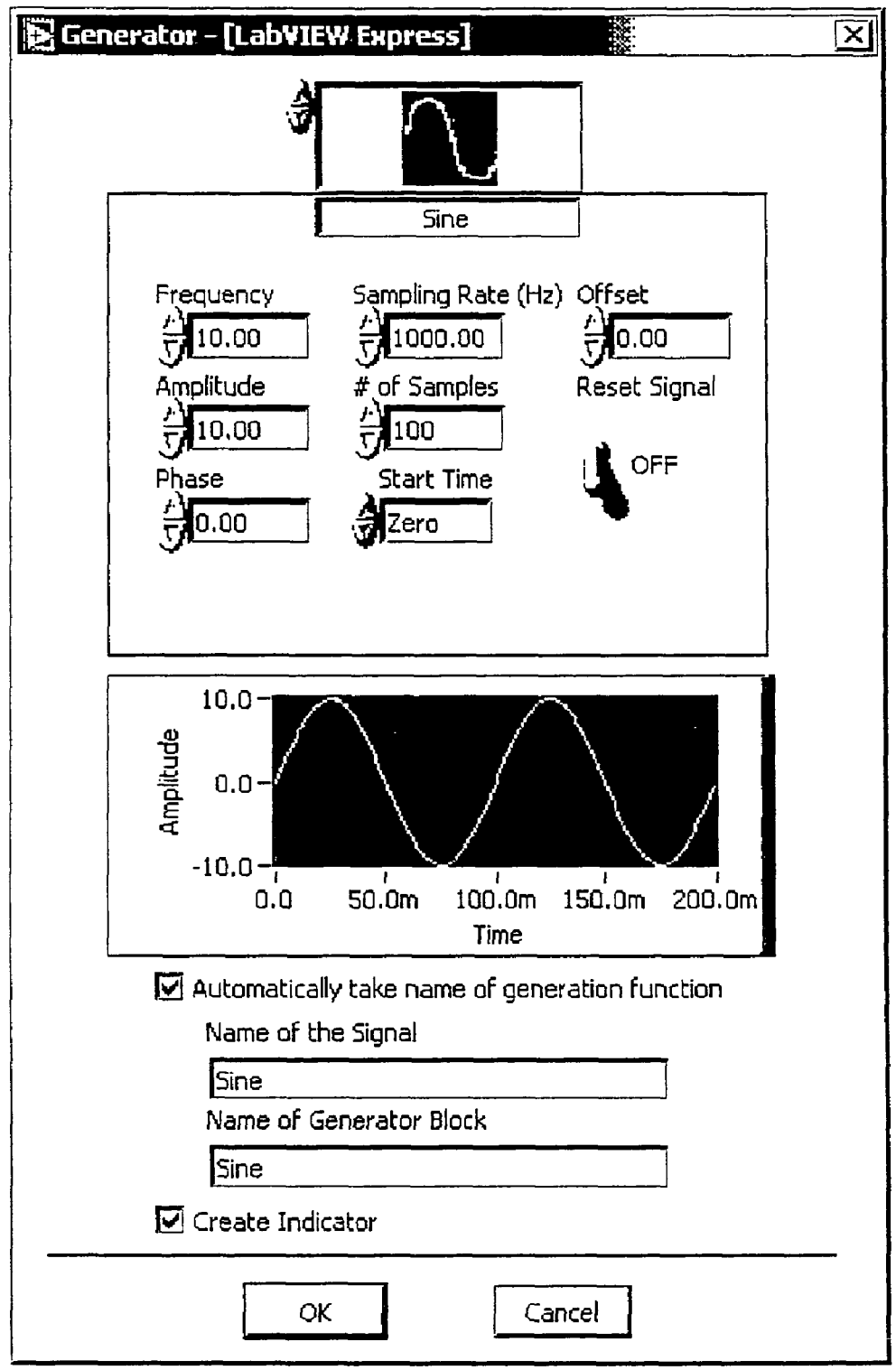
FIG. 17 illustrates an exemplary configuration user interface for configuring a waveform generator SDB node.

FIG. 17—Exemplary Configuration User Interface

As described above, in one embodiment, an SDB node may have an associated configuration user interface for receiving user input to configure the SDB node. FIG. 17 illustrates an exemplary configuration user interface for configuring an SDB node designed to generate waveforms. In response to the user specifying different settings for the GUI controls on the configuration user interface, different execution-time code may be programmatically generated for the waveform generator SDB node.

Static Binding of Nodes to Virtual Instruments

In various examples of graphical programming environments (e.g., LabVIEW), a user typically has several options if the user wishes to invoke a graphical program such as a virtual instrument (VI). In addition to the standard, hard-coded instantiation of a subVI, the user may open a reference to the VI and then call the VI by reference. Typically, a user may use two separate and distinct facilities to make this call by reference.

Figure 18:
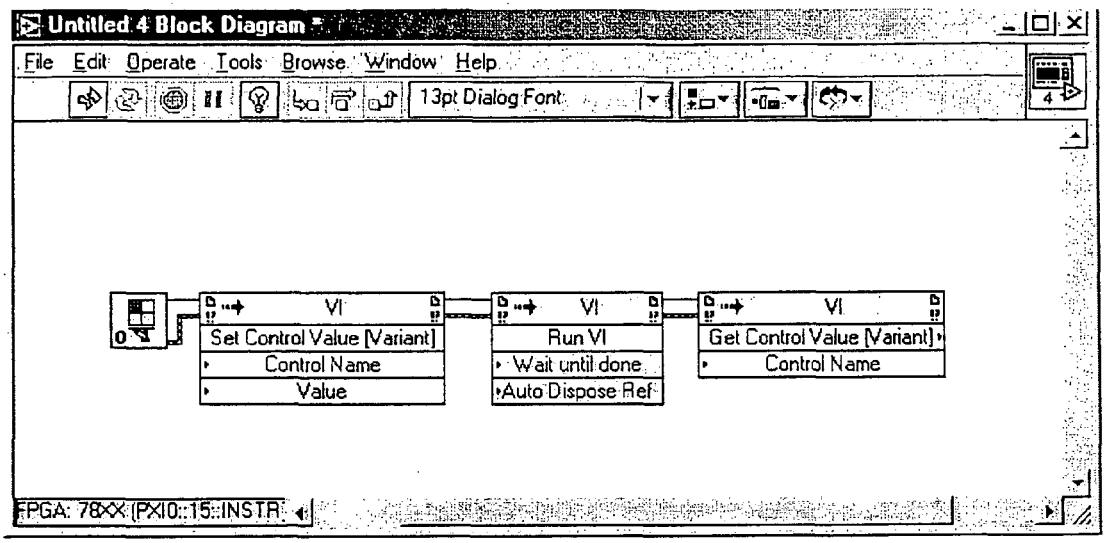
FIG. 18 illustrates get and set control value methods according to one embodiment.

First, method nodes may be used to get and set control and indicator values asynchronously. FIG. 18 illustrates an example of get and set control value methods. A method may also be used to run the VI at any point and independent of the control methods, thereby allowing the user to interact with the VI without being constrained to a single call. However, the get and set methods are fully runtime dynamic, so the data type of a control or indicator (or even its existence) may not be guaranteed at edit time. In addition to this complication, this dynamic behavior may add a degree of overhead that precludes optimal performance.

Figure 19:
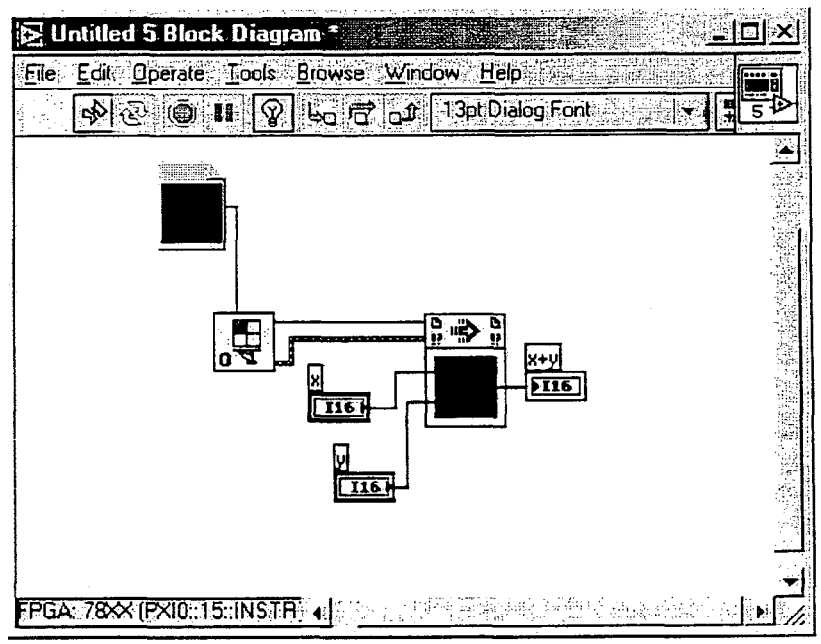
FIG. 19 illustrates a call-by-reference node according to one embodiment.

In one exemplary graphical programming environment (LabVIEW), the second method of referenced VI invocation is the call-by-reference node. FIG. 19 illustrates an example of a call-by-reference node. In this case, a single node sets all control values, runs the VI, waits for the VI to finish, and returns all indicator values. The connectors of the node replicate the connector pane of the VI, using the actual data types instead of variants or flattened strings. The node is strictly typed to just the connector pane, instead of a particular VI, and this node therefore uses a dynamic call. Any VI with the same connector pane layout can be called from that node.

The system and method for static binding described herein provides a way to interact individually with controls and indicators of a VI running asynchronously, wherein the values read and written are strictly typed to the data type of the control. Using this system and method, the overhead of dynamic invocation may be substantially eliminated to allow for greater efficiency.

In one embodiment, a system and method for strict VI reference may be useful in communicating with a programmable hardware element (e.g., an FPGA), where the overhead of dynamic calls in relation to the number of parameters passed in fast control loops would represent a significant overhead. Typically, programmable hardware element VIs have more controls and indicators than supported by a connector pane, thereby obstructing the use of the call by reference node.

The system and method for strict VI reference may include an additional framework for obtaining and using VI references. In contrast to the typical approach described above, the new references may be statically bound to a specific VI, instead of being completely dynamic or typed to a connector pane. VI references in previous approaches may not propagate sufficient information to specify all controls and indicators of the VI and adapt to changes in that VI. Therefore, the system and method for strict VI reference may also include a new refnum (reference number) type.

Figure 20:
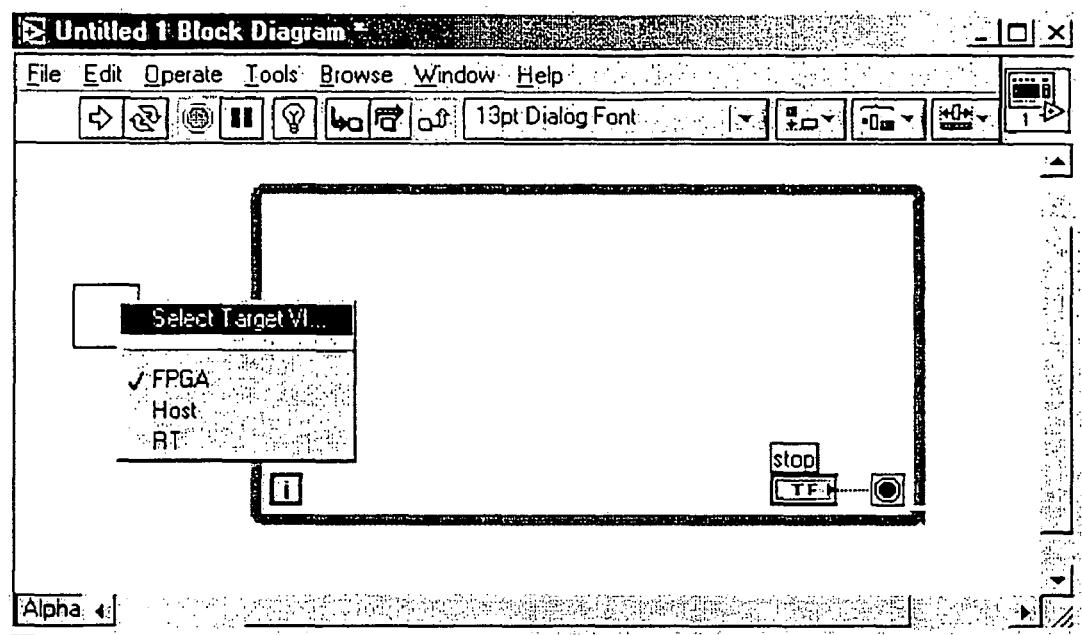
FIG. 20 illustrates the configuration of an open node according to one embodiment.
Figure 21:
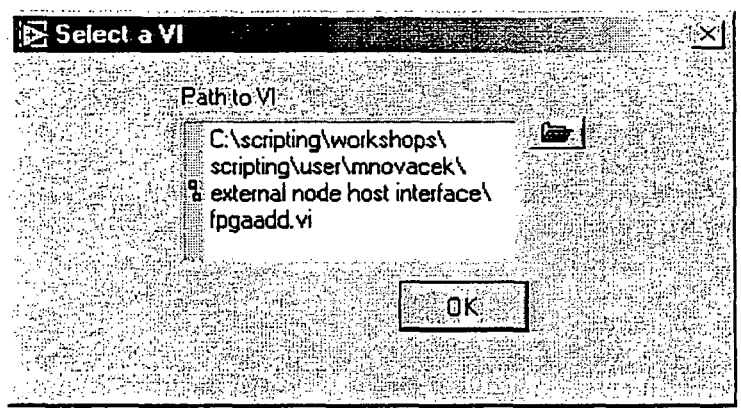
FIG. 21 illustrates the selection of a VI according to one embodiment.
Figure 22:
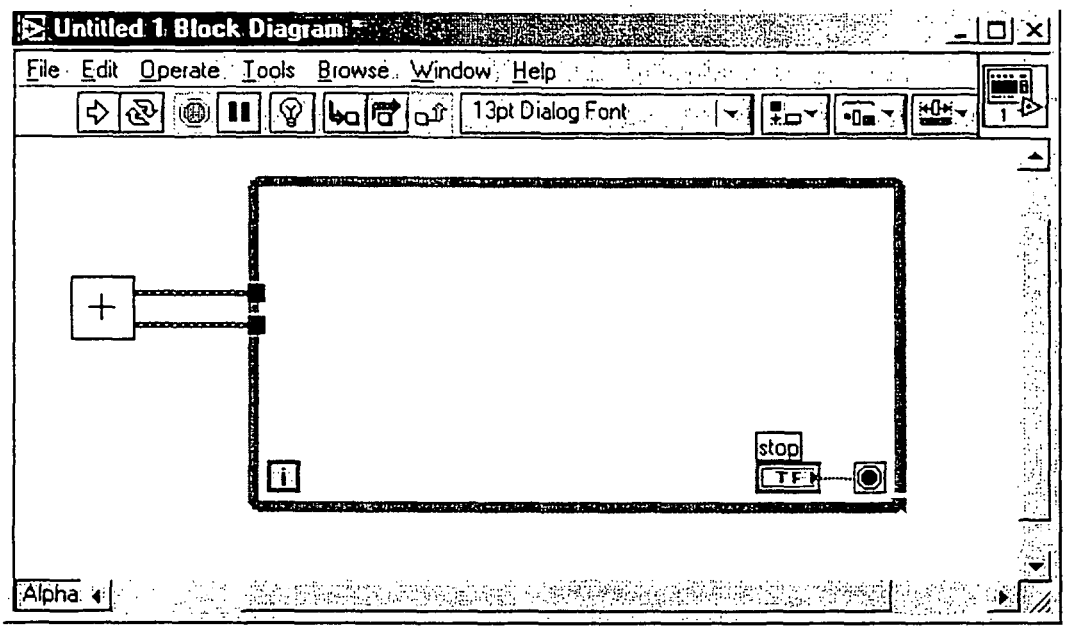
FIG. 22 illustrates a configured open node with refnum and error outputs according to one embodiment.

In one embodiment, the strict VI reference may be used in a manner that is similar to the typical VI reference. In one embodiment, a node is placed in a diagram to open the reference, similar to the current "Open VI Reference" node. However, configuration takes place from the node's context menu and associated dialogs, rather than from wired inputs to the node. FIG. 20 illustrates the configuration of an open node according to one embodiment. This configuration process ensures that the configuration is defined at edit time, rather than at run time, thereby allowing the VI call to be statically bound to the VI. FIG. 21 illustrates the selection of a VI according to one embodiment. The output of this node is a reference number (refnum) with its type specific to the VI (as well as other configuration details). FIG. 22 illustrates a configured open node with refnum and error outputs according to one embodiment.

In one embodiment, the platform on which the VI should be opened may also be selected from the open node. Potential platforms may include, for example, the VI reference on the local host machine, a remote machine on the network, or a programmable hardware element (e.g., an FPGA). This platform information may be included in the refnum output of the node for use by other nodes in their configuration.

In one embodiment, the open node may also be configurable to run the VI as soon as it is open. In this usage, the controls and indicators of the VI will be accessed after the VI has started running. Alternatively, the open node will not run the VI and an additional node can be used to start the VI running after several values have been written to the controls.

In one embodiment, a read/write node may be used to access the controls and indicators of the VI. The read/write node may be similar in appearance to the property node. In one embodiment, when the refnum input of this node is wired to the output of the open node, the read/write node will adapt to the type of the refnum, output the same refnum type, and determine the controls/indicators that are valid for the currently selected VI. The node may be configured from its context menu.

Figure 23:
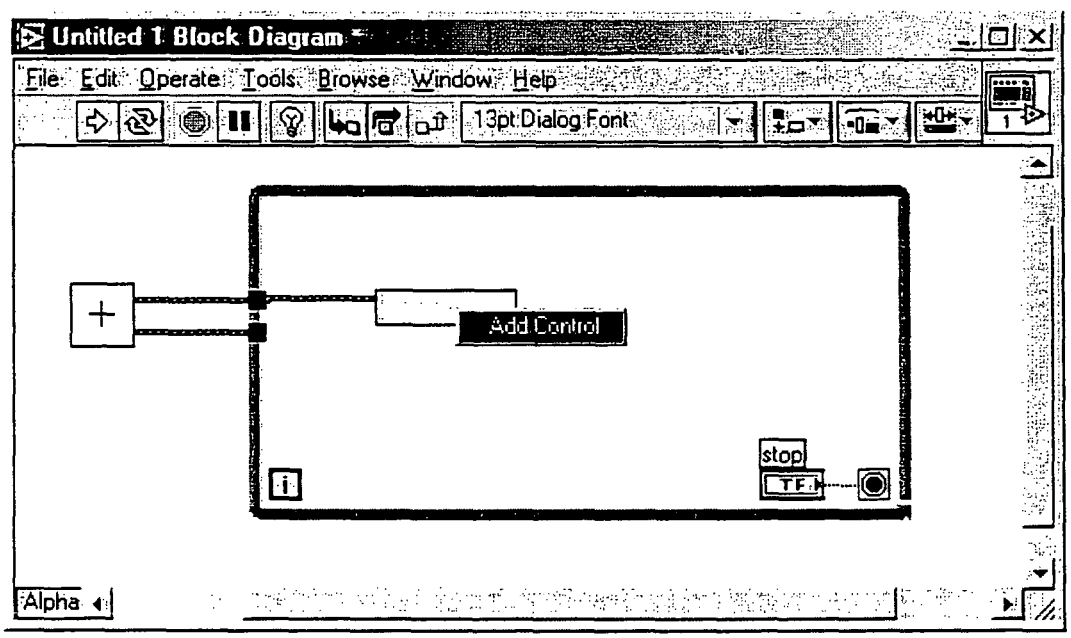
FIG. 23 illustrates the addition of terminals to a read/write node according to one embodiment.
Figure 24:
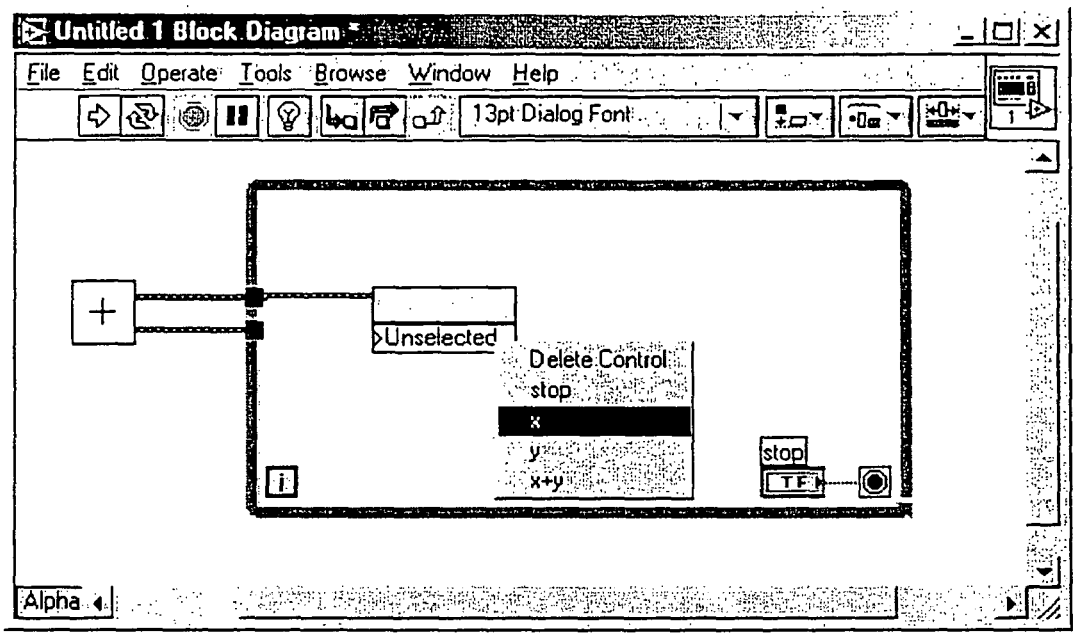
FIG. 24 illustrates the selection of a control for a read/write node according to one embodiment.
Figure 25:
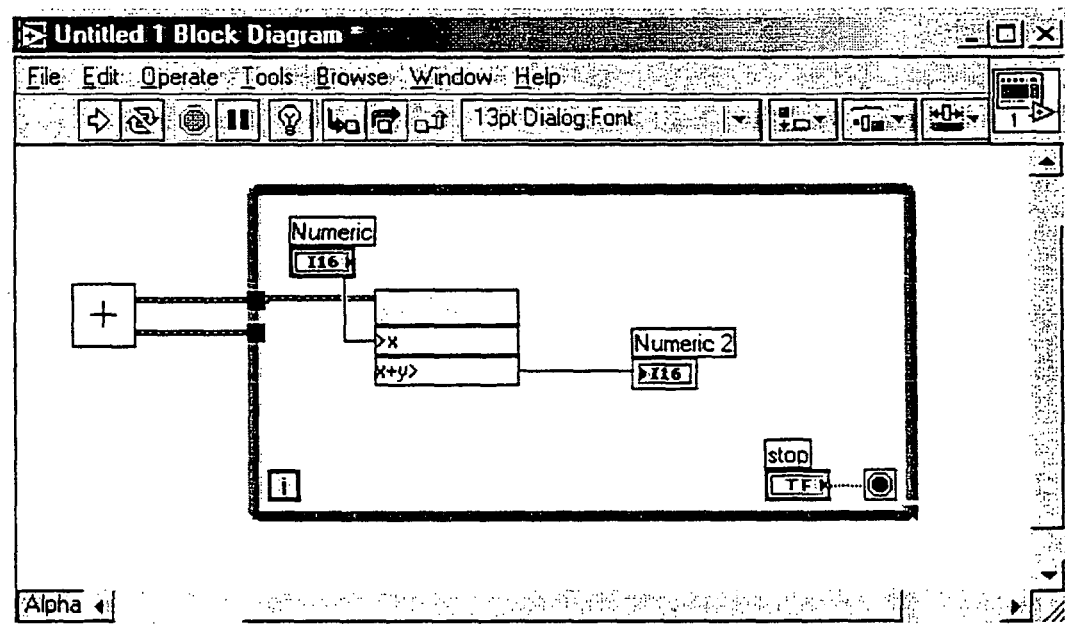
FIG. 25 illustrates a configured static VI call according to one embodiment.

Terminals may be added to the node. FIG. 23 illustrates the addition of terminals to a read/write node according to one embodiment. For each terminal, the associated control on the target VI may be selected. FIG. 24 illustrates the selection of a control for a read/write node according to one embodiment. Any of the controls and indicators of the selected VI are available in one embodiment, including those not on the connector pane. The data type of the terminal may be explicitly set to the type of the control, rather than simply a variant or flattened string. FIG. 25 illustrates a configured static VI call according to one embodiment.

Figure 26:
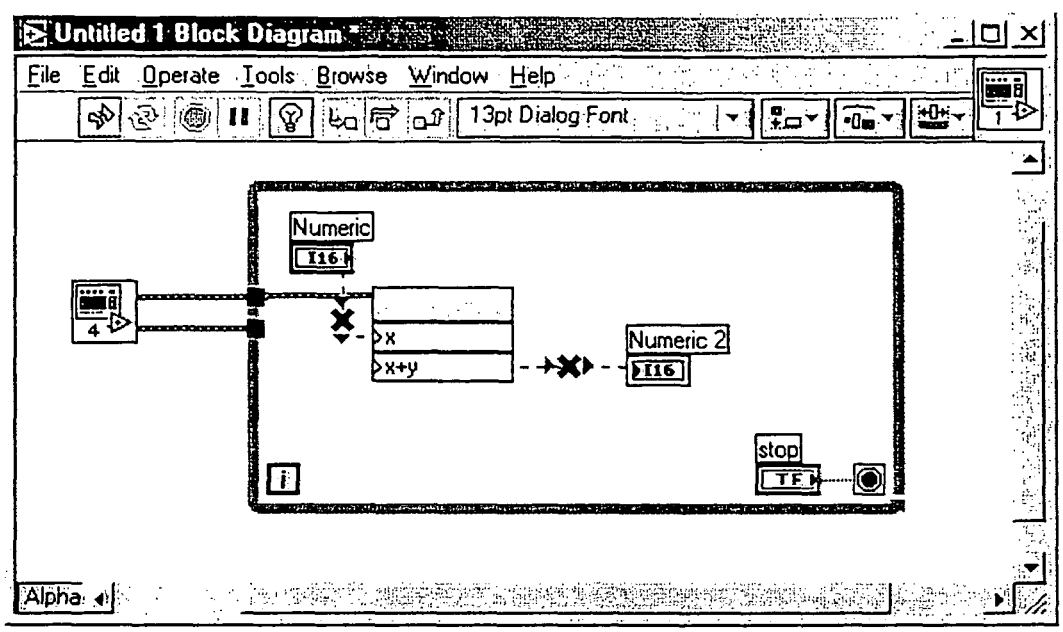
FIG. 26 illustrates a broken static call after choosing another VI according to one embodiment.

In one embodiment, if the VI selection made on the open node is changed, the refnum output by that node will change appropriately. In response, the read/write nodes will change their refnum output and check the new refnum type against their selected controls. If any of the selected control names are no longer valid, the corresponding terminal will be removed from the node and the wire connected from that terminal will be invalidated, thereby breaking the diagram. Alternatively, a terminal may be invalidated in some other manner, such as changing to another datatype including a "void" datatype. Similarly, changes in the refnum may not invalidate selected controls, but the type or direction of a terminal may be modified if the selected control of the new selected VI is of a different type or direction than the old. These modifications may also occur if the selected VI is modified (e.g., an addition, removal, or other change in the controls). FIG. 26 illustrates a broken static call after choosing another VI according to one embodiment. In this manner, the system and method for strict VI reference may prevent the user from having an invalid configuration selected on the diagram.

In one embodiment, the basis for implementing the strict VI reference functionality is the SDB node. As discussed with reference to FIGS. 4-17, the SDB node provides the ability to script code (programmatically generate code) in response to the context as well as in response to type propagation. In this way, changes selected from the open node are reflected in the refnum output. When the changes propagate to the read/write nodes, the read/write nodes will re-script themselves and output the same refnum. The configuration therefore cascades down the line, thereby keeping the configuration current and valid. Additionally, an instance of the selected VI can be placed into a non-executing frame in the open node in one embodiment. In this way, changes to the VI may cause the SDB nodes to re-script if appropriate. In the present application, the term "script" refers to programmatic generation of code.

Additionally, the SDB node may remove the overhead of a subVI call. Therefore, the SDB node may fulfill the requirement of fast and efficient operation when communicating with a fast control loop in a programmable hardware element such as an FPGA.

The contents of the SDB nodes may vary depending on the platform selected. The open node may contain a VI refnum open of the type appropriate to the platform. In the case of the local host, the "Open VI Reference" node may be used. In the case of the a programmable hardware element, a subVI may be placed into the SDB node that will download the appropriate VI to the board. In either case, the output may be cast bundled into the refnum of the appropriate type.

The read/write nodes may include access nodes specific to the platform. When targeted to the local host, the VI server get and set methods may be used, and the outputs may be unflattened to the appropriate data types. In one embodiment, when the a programmable hardware element is selected, VISA (Virtual Instrument System Architecture) reads and writes may be used to access the register corresponding to the selected control. In this case, due to the optimizations already made to the VISA peeks and pokes, the execution may take place at an increased rate.

Figure 27:
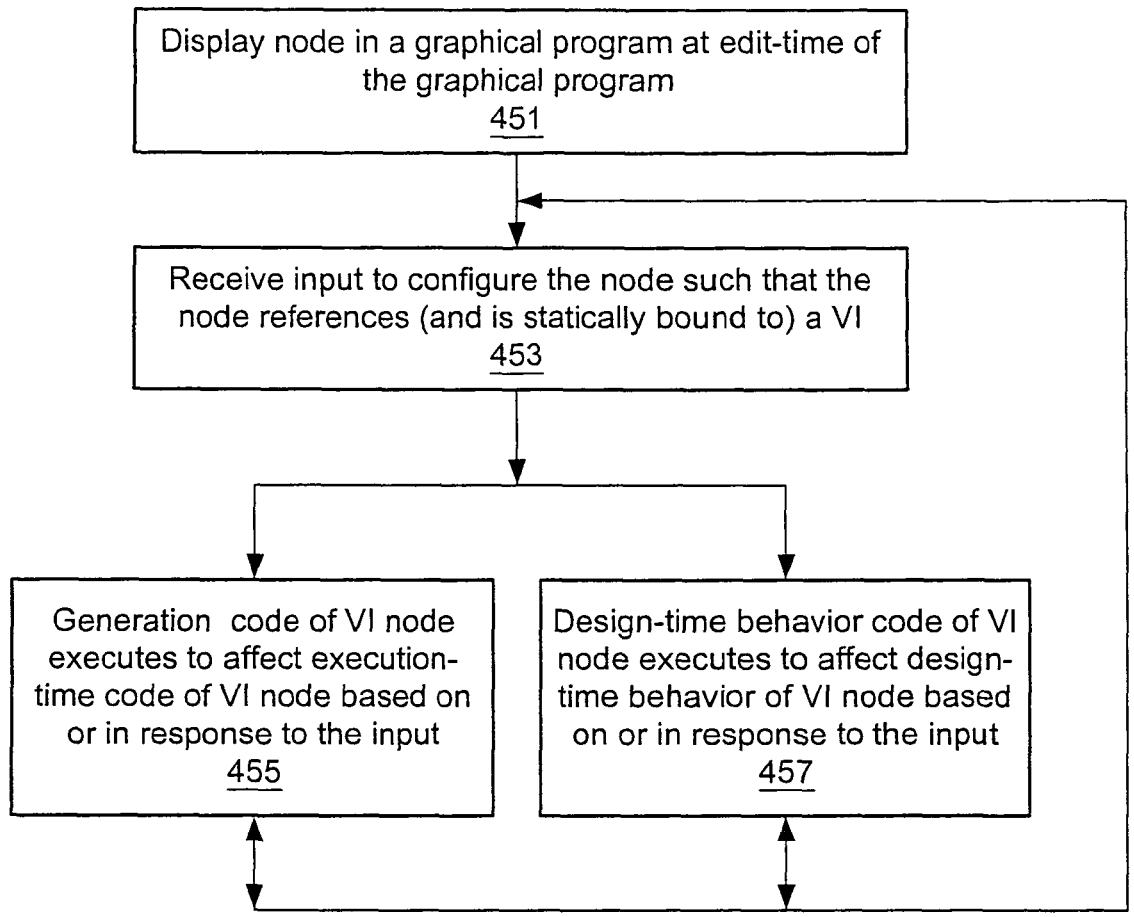
FIG. 27 is a flowchart diagram illustrating one embodiment of a method for creating a graphical program that utilizes static binding of nodes to VIs.

FIG. 27—Creating a Graphical Program that Utilizes Static Binding of Nodes to VIs FIG. 27 is a flowchart diagram illustrating one embodiment of a method for creating a graphical program that utilizes static binding of nodes to virtual instruments (VIs). It is noted that FIG. 27 illustrates a representative embodiment, and alternative embodiments are contemplated. Also, various steps may be combined, omitted, or performed in different orders.

In 451, a node may be displayed in a graphical program at edit-time of the graphical program, i.e., as the graphical program is being created or edited. For example, the node may be displayed in a block diagram of the graphical program in response to a user requesting to include the node in the block diagram. As described above with reference to FIG. 9, the node may be one of a plurality of nodes in the block diagram. The graphical program or block diagram may be created or assembled by the user arranging on the display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons that visually indicate the functionality of the program. As described above, a user interface or front panel for the graphical program may also be created, e.g., in response to user input.

In 453, input to edit the graphical program may be received. The input may select a virtual instrument to be invoked by reference by the node. Based on the input received and/or in response to the input received, the generation code of the node may execute in 455 to programmatically generate or affect execution-time code of the node, and/or design-time behavior code of the node may execute in 457 to affect design-time behavior of the node.

The generation of the execution-time code of the node may be performed based on or in response to any of various kinds of input received in 453. In one embodiment, the input may comprise input to a block diagram of the graphical program. For example, the input may be received in the process of creating the plurality of interconnected nodes as described above.

As one example, the input received in 453 may include input specifying the connection of one or more inputs to input terminals of the node. For example, the generation code of the node may be operable to programmatically generate execution-time code based on data types of the inputs. For example, the generation code may enable the node to exhibit polymorphic behavior, as discussed in more detail below. Also, the execution-time code may be programmatically generated based on one or more values of the connected inputs. For example, if a constant integer input value within a first range is connected to the node, first execution-time code may be generated, wherein the first execution-time code has first functionality, and if a constant integer input value within a second range is connected to the node, second execution-time code may be generated, wherein the second execution-time code has second functionality.

As another example, the execution-time code may be generated based on which particular subset of inputs are connected to the node. The node may have a plurality of input terminals, but the user may not be required to connect inputs to all of the terminals. As a simple example, consider an node having a first input terminal, wherein an input connected to the first input terminal may affect execution behavior of the node, or there may be no effect on the execution behavior of the node if no input is connected to the first input terminal. Thus, if no input is connected to the first input terminal, then the generation code may programmatically generate execution-time code for the node that does not include logic for checking the value of an input connected to the first input terminal and responding to the input value. This may result in the execution-time code being smaller and more efficient.

In a case in which the execution-time code is generated based on which particular subset of inputs are connected to the node, it may be difficult to know at edit-time which inputs will eventually be connected to the node. In one embodiment, the generation code may execute each time the subset of connected inputs changes and may interactively re-generate or modify the execution-time code each time based on the connected inputs. In another embodiment, it may be desirable to generate the execution-time code a single time, e.g., after the user has finished editing the graphical program. For example, the generation code associated with the node may be executed to generate the execution-time code when the graphical program is compiled or just prior to execution of the graphical program. Thus, in various embodiments, the generation code may execute to generate execution-time code for the node based on input received to edit the graphical program, but may not execute immediately in response to the input.

As another example, the execution-time code may be generated based on which other nodes the user includes in the graphical program or based on the configuration of other nodes in the graphical program. As a simple example, consider an node designed to analyze data acquired from an acquisition node, wherein the acquisition node is configurable to acquire data from different types of sources. It may be desirable to analyze the data differently, depending on the source type from which the data is acquired. For example, if the user configures the acquisition node to acquire data from a first source type, the generation code of the node may execute to generate first execution-time code having first functionality, and if the user configures the acquisition node to acquire data from a second source type, the generation code of the node may execute to generate second execution-time code having second functionality, wherein the first functionality is different than the second functionality.

In various embodiments, the execution-time code for the node may be generated or modified based on or in response to user input received to configure the node in the graphical program. The node may be able to take on different functionality in the graphical program, depending on configuration user input received. For example, the node may be generally related to a particular functional realm, such as data acquisition, signal analysis, data display, network communications, etc. However, until configuration user input is received for the node, the exact execution-time behavior of the node within the graphical program may be undefined.

In one embodiment, the node may have a configuration user interface for configuring the node, e.g., for specifying desired execution-time functionality of the node. For example, the configuration user interface may include one or more graphical panels or windows. The configuration user interface may comprise information useable in guiding the user to specify desired functionality for the node. The node may be configured to perform a variety of functions within the graphical program, depending on user input received to the configuration user interface. As noted above, the node may be generally related to a particular functional realm, such as data acquisition, signal analysis, data display, etc. Thus, the configuration user interface may display information related to the particular functional realm. For example, for an node related to network communications, the configuration user interface may include GUI controls for specifying a data source or target to which to connect when the node is executed, specify a connection protocol to use, etc.

Thus, in one embodiment, creating the node as described above may also include creating a configuration user interface for the node. After the node has been included in the graphical program, the user may invoke the configuration user interface to configure the node, e.g., by double-clicking on the node, selecting a menu option to request to configure the node, or in any of various other ways.

Thus, in one embodiment an node may be configured to perform a plurality of operations, depending on user input specifying configuration information for the node. The configuration user interface may enable the user to specify one or more desired operations for the node from the plurality of possible operations. However, since the execution-time code associated with the node may be generated programmatically, a "minimal" amount of execution-time code may be generated, i.e., only code necessary to implement the one or more specified operations may be generated. Thus, code corresponding to operations from the plurality of operations that are not among the one or more specified operations may not be included in the graphical program. Associating a minimal amount of execution-time code with a node in a graphical program node in this way may be advantageous in some situations, e.g., by reducing the size of the graphical program.

In various other embodiments, the execution-time code for the node may be generated based on any of various other kinds of input to edit the graphical program. For example, in one embodiment, the generation code may be operable to generate the execution-time code in response to displaying the node in the graphical program in 451. In another embodiment, receiving input to edit the graphical program in 453 may include receiving input to edit a user interface or front panel of the graphical program, and the execution-time code may be programmatically generated based on this input.

Referring again to FIG. 27, 457 illustrates that in one embodiment, design-time behavior code of the node may execute to affect design-time behavior of the node based on or in response to the input received to edit the graphical program. In various embodiments, the design-time behavior code may affect any of various aspects of the design-time behavior of the node. For example, the design-time behavior code may affect a user's experience of interacting with or viewing the node when editing the graphical program. In one embodiment, the design-time behavior code may execute in response to user input received to a block diagram of the graphical program. For example, the user input may be received in the process of creating the plurality of interconnected nodes as described above.

In some embodiments, the user input may be received to the node itself. For example, user input to the node may include: selecting the node; clicking on the node (e.g., left-clicking, right-clicking, or double-clicking); re-sizing the node; moving the node to another location within the block diagram; moving a mouse cursor over the node; etc.

As one example, the design-time behavior code of the node may be operable to display a custom context menu or popup menu for the node, e.g., in response to the user right-clicking on the node. For example, the context menu may include items operable to invoke a user interface to configure the node or checkable Boolean items indicating desired properties of the node. For example, these properties may affect the generation of the execution-time code for the node. The menu items may also allow the user to specify desired edit-time behavior of the node, e.g., whether to dynamically change the input/output terminals of the node as described below.

As another example, the design-time behavior code may be operable to change the number of input/output terminals of the node and/or may affect the terminal names. For example, after the user has configured the node using a configuration user interface such as described above, some of the possible input/output terminals may not be applicable. Thus, the design-time behavior code may execute to dynamically display only relevant terminals. For example, before the user configures the node, a first output terminal may be displayed. If the first output terminal is no longer relevant after the user configures the node, the design-time behavior code may cause this terminal to be hidden. Similarly, if a first input terminal is hidden before the user configures the node, the design-time behavior code may cause the first input terminal to be displayed after the user configures the node if the new configuration requires input to this terminal or makes the terminal relevant.

The terminals of the node may also be affected depending on any of various other kinds of input. For example, if the user connects an input of a first data type to a first input terminal that makes a second input terminal irrelevant, then the second input terminal may be hidden. As another example, if the user connects an input of a first data type to a first input terminal, then a displayed name for the first input terminal or for another terminal may be changed, e.g., to more precisely indicate the purpose of the terminal.

As another example, the design-time behavior code may be operable to change the iconic appearance of the node within the graphical program. For example, the node may have a default icon, and the design-time behavior code may dynamically change the icon depending on how the node has been configured within the graphical program, e.g., depending on input received to a configuration user interface, depending on inputs connected to the node, depending on which nodes the node provides outputs to, etc. As an example, consider a polymorphic node operable to perform a polymorphic operation on two inputs. The icon for the node may be dynamically changed depending on the data types of inputs the user connects to the node, e.g., to more descriptively represent the operation of the node. The new icon may take on any of various shapes or sizes. For example, most nodes in the graphical program may be displayed using an icon of a fixed size, e.g., 32×32 pixels. However, the node may be represented using a larger or smaller icon, as appropriate. Also, a node may be displayed using an icon of any arbitrary shape in addition to square or rectangular icons. For example, the shape and appearance of the icon may change depending on user input.

As another example, the design-time behavior code may be operable to affect the node's behavior in response to the user moving a mouse cursor over the node. For example, the design-time behavior code may display an informative message which may vary depending on the current configuration of the node. As another example, if some of the node's input/output terminals have been hidden as described above, then the design-time behavior code may cause all of the terminals to be temporarily displayed while the mouse cursor is located over the node.

In various embodiments, a user interface or dialog may be displayed for various other purposes besides configuring functionality of the node and may be displayed in response to any of various causes or conditions. As one example, if the user connects an input having an invalid data type to an input terminal of the node, the design-time behavior code may be operable to display a dialog informing the user of the error and informing the user how to correctly use the node.

In one embodiment, both the generation code and the design-time behavior code may execute in response to a given input to edit the graphical program. As one example, in response to receiving input via a configuration user interface to configure the node, the generation code may execute to generate execution-time code based on the specified configuration, and the design-time behavior code may execute to cause a descriptive icon to be displayed based on the specified configuration. In other embodiments, the generation code may execute in response to a given input, but the design-time behavior code may not execute, or vice versa.

Referring again to FIG. 27, the arrows returning from 455 and 457 to 453 indicate that 453, 455, and 457 may be performed repeatedly.

It is noted that FIG. 27 represents one embodiment of a method for creating a graphical program that utilizes an node, and variations of the method are contemplated. For example, in various embodiments, the generation code may be operable to programmatically generate execution-time code for the node based on or in response to any of various other events, conditions, or information besides input received to edit the graphical program. Similarly, the design-time behavior code may also be operable to affect design-time behavior of the node based on or in response to factors other than input received to edit the graphical program.

For example, in one embodiment the method may comprise determining code generation dependency information, wherein the generation code is operable to generate or modify the execution-time code for the node based on or depending on the code generation dependency information. In various embodiments, the code generation dependency information may include information of any kind and from any source. For example, the code generation dependency information may be associated with one or more of: a state of the graphical program; a state of the node or another node in the graphical program; a state of a graphical programming development environment application used to create the graphical program; etc.

As one example, the graphical programming development environment may allow the user to set options regarding a computing platform on which the graphical program is intended to execute. Thus, execution-time code for the node may be generated differently depending on the target platform. For example, if the graphical program will execute on an FPGA device, the execution-time code may be generated in such a way as to facilitate the graphical program to execute efficiently when deployed on the FPGA device.

In other embodiments, the code generation dependency information may include information determined from a source external to the graphical program and external to a graphical programming development environment application used to create the graphical program. For example, the code generation dependency information may be received from a second application external to the graphical programming development environment application, such as another programming environment application or another type of application. As another example, the code generation dependency information may be received from a computer server via a network. For example, the computer server may provide information to allow the execution-time code of the node to be updated periodically, e.g., to extend the functionality of the node or to provide bug fixes.

As another example of code generation dependency information, the generation code may be operable to programmatically generate or modify execution-time code for the node based on the user's history of using the node. For example, when the node was previously used in a first graphical program, the user may have utilized a configuration user interface to configure the node as described above, and execution-time code may have been dynamically generated based on the user's input. The configuration information specified by the user may be stored such that when the user later includes the node in a second graphical program, the node is automatically configured as in the first graphical program, and execution-time code for the node in the second graphical program may be programmatically generated identically as in the first graphical program. Also, separate history information may be maintained for different users, e.g., so that the node may behave differently when different users are creating graphical programs.

Also, in one embodiment the generation of the execution-time code may depend on input received from other sources besides a user. For example, the above-incorporated patent application titled, "System and Method for Programmatically Generating a Graphical Program in Response to Program Information" discloses a method in which a client application may programmatically specify the creation of a graphical program. Thus, for example, a server application may programmatically create the graphical program based on input received from the client application. Where the client application specifies the inclusion of an node in the graphical program, the execution-time code for the node may be dynamically generated based on other information specified by the client application, such as other nodes specified for inclusion in the graphical program, data types of inputs specified for connection to the node's input terminals, etc.

The design-time behavior code may also execute in response to factors other than input to edit the graphical program. For example, the design-time behavior code may be operable to affect design-time behavior of the node based on design-time behavior information, wherein the design-time behavior information may include information of any kind and from any source. As one example, the design-time behavior information may be received from a second application external to the graphical programming development environment application used to create the graphical program. For example, the user may use an external application to configure hardware devices coupled to the computer system. For example, if a data acquisition (DAQ) device is coupled to the computer system, the user may create various named channels referencing the device. Thus, if the node is designed to perform a DAQ-related function, then the design-time behavior code associated with the node may be operable to determine the channel information and affect design-time behavior of the node in various ways based on the channel information. For example, if the user specifies an invalid channel as an input to the node, the design-time behavior code may be operable to alert the user of this error, e.g., by affecting the appearance of the node or otherwise drawing the user's attention.

In various embodiments, multiple nodes may be included in a graphical program, and the nodes may interact with each other in various ways. As one example, a pair of nodes may perform a function together, and changing one of the nodes may affect the other. For example, if the user utilizes a configuration user interface to re-configure one of the nodes, then the execution-time code for both of the nodes may be re-generated in response.

It is noted that the above examples of the generation code programmatically generating or modifying execution-time code for the node are intended to be exemplary only, and many other possible uses of the generation code are contemplated. Similarly, the above examples of the design-time behavior code affecting behavior of the node are intended to be exemplary only, and many other possible uses of the design-time behavior code are contemplated.

Figure 28:
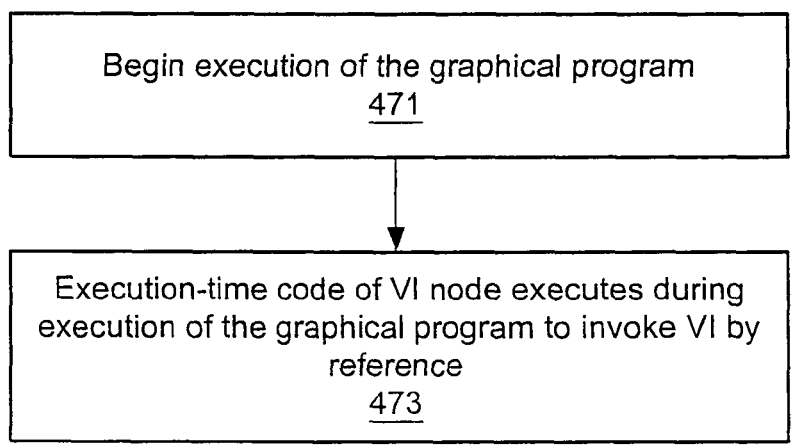
FIG. 28 is a flowchart diagram illustrating one embodiment of a method for executing a graphical program that utilizes static binding of nodes to VIs.

FIG. 28—Executing a Graphical Program that Utilizes Static Binding of Nodes to VIs FIG. 28 is a flowchart diagram illustrating one embodiment of a method for executing a graphical program that static binding of nodes to virtual instruments (VIs). It is noted that FIG. 28 illustrates a representative embodiment, and alternative embodiments are contemplated. Also, various steps may be combined, omitted, or performed in different orders.

In 471, the graphical program may begin execution. The graphical program may be executed on any kind of computer system(s) or (re)configurable hardware.

In 473, the execution-time code of the VI node in the graphical program may be executed, wherein the execution-time code was programmatically generated or modified by generation code associated with the node, as described above with reference to FIG. 27. By executing the code of the VI node, the VI that was statically bound to the VI node is invoked by reference.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer-accessible memory medium that stores program instructions executable by a processor to implement:
   displaying a first node in a first graphical data flow program, wherein the first graphical data flow program comprises a first plurality of interconnected nodes that visually indicate functionality of the first graphical data flow program;
   receiving user input at edit time to configure the first node to reference a second graphical data flow program, wherein the second data flow graphical program comprises a second plurality of interconnected nodes that visually indicate functionality of the second graphical data flow program, and wherein the second graphical data flow program is configured to execute asynchronously with respect to the first graphical data flow program;
   statically binding the first node to the second graphical data flow program in response to the user input, wherein said statically binding is performed at edit time; and
   validating compatibility between the first node and the second graphical data flow program based on said static binding, wherein said validating compatibility is performed at edit time;
   wherein during execution of the first graphical data flow program, the second graphical data flow program executes asynchronously with respect to the first graphical data flow program, and communicates with the second graphical data flow program via one or more strictly typed input or output parameters.

2. The non-transitory computer-accessible memory medium of claim 1, wherein the program instructions are further executable to implement:
   executing the first graphical data flow program, wherein said executing the first graphical data flow program comprises the first graphical data flow program invoking execution of the second graphical data flow program.

3. The non-transitory computer-accessible memory medium of claim 1,
   wherein the first node comprises one or more terminals for receiving inputs to or providing outputs from the second graphical data flow program; and
   wherein the first graphical data flow program communicates the one or more strictly typed input or output parameters with the second graphical data flow program via the one or more terminals.

4. The non-transitory computer-accessible memory medium of claim 3,
   wherein the second graphical data flow program comprises one or more typed user interface elements, and wherein the terminals correspond to the one or more typed user interface elements, and wherein the one or more strictly typed input or output parameters are strictly typed to the typed user interface elements; and
   wherein the first graphical data flow program communicates the one or more strictly typed input or output parameters via the one or more typed user interface elements of the second graphical data flow program.

5. The non-transitory computer-accessible memory medium of claim 4, wherein in response to said statically binding, the first node comprises a reference to the second graphical data flow program, and wherein said executing the first graphical data flow program comprises:

propagating to one or more other nodes in the first graphical data flow program the reference to the second graphical data flow program whereby the first graphical data flow program communicates with the second graphical data flow program.

6. The non-transitory computer-accessible memory medium of claim 5, wherein the one or more user interface elements comprise one or more controls or indicators for receiving inputs to or displaying outputs from the second graphical data flow program, respectively, wherein the one or more other nodes in the first graphical data flow program comprise a read node, wherein said executing the first graphical data flow program comprises the read node receiving a value of a strictly typed output parameter from an indicator of the graphical user interface of the second graphical data flow program via the reference to the second graphical data flow program.

7. The non-transitory computer-accessible memory medium of claim 5, wherein the one or more user interface elements comprise one or more controls or indicators for receiving inputs to or displaying outputs from the second graphical data flow program, respectively, wherein the one or more other nodes in the first graphical data flow program comprise a write node, wherein said executing the first graphical data flow program comprises the write node sending a value of a strictly typed input parameter to a control of the graphical user interface of the second graphical data flow program via the reference to the second graphical data flow program.

8. The non-transitory computer-accessible memory medium of claim 5, wherein said receiving user input at edit time to configure the first node to reference a second graphical data flow program further comprises receiving user input specifying a target platform on which the second graphical data flow program is to execute, and wherein said propagating further comprises propagating information regarding the target platform to the one or more other nodes.

9. The non-transitory computer-accessible memory medium of claim 5,
wherein said executing the first graphical data flow program comprises one of the one or more other nodes invoking execution of the second graphical data flow program.

10. The non-transitory computer-accessible memory medium of claim 2, wherein said executing the first graphical data flow program comprises the first node invoking execution of the second graphical data flow program.

11. The non-transitory computer-accessible memory medium of claim 1, wherein said receiving user input at edit time to configure the first node to reference a second graphical data flow program further comprises receiving user input specifying a target platform on which the second graphical data flow program is to execute.

12. The non-transitory computer-accessible memory medium of claim 11,
wherein the target platform comprises a programmable hardware element.

13. The non-transitory computer-accessible memory medium of claim 11,
wherein the target platform comprises a local computer.

14. The non-transitory computer-accessible memory medium of claim 11,
wherein the target platform comprises a remote computer.

15. The non-transitory computer-accessible memory medium of claim 1, wherein the program instructions are further executable to implement:

receiving further user input at another edit time to reconfigure the first node to reference a third graphical data flow program instead of the second graphical data flow program, wherein the third graphical data flow program comprises a third plurality of interconnected nodes that visually indicate functionality of the third graphical data flow program, and wherein the third graphical data flow program is configured to execute asynchronously with respect to the first graphical data flow program; and statically binding the first node to the third graphical data flow program in response to the further user input, wherein said statically binding is performed prior to execution of the first graphical data flow program, and wherein said statically binding the first node to the third graphical data flow program replaces the static binding of the first node to the second graphical data flow program;

wherein during execution of the first graphical data flow program, the third graphical data flow program executes asynchronously with respect to the first graphical data flow program, and the first graphical data flow program communicates with the third graphical data flow program via at least one strictly typed input or output parameter.

16. The non-transitory computer-accessible memory medium of claim 15, wherein the program instructions are further executable to implement:

executing the first graphical data flow program, wherein said executing the first graphical data flow program comprises the first graphical data flow program invoking execution of the third graphical data flow program, wherein the third graphical data flow program executes asynchronously with respect to the first graphical data flow program.

17. The non-transitory computer-accessible memory medium of claim 16, wherein during execution of the first graphical data flow program, the first node provides to one or more other nodes in the first graphical data flow program a reference to the third graphical data flow program whereby the first graphical data flow program communicates with the third graphical data flow program.

18. The non-transitory computer-accessible memory medium of claim 1,
wherein the first graphical data flow program is configured to perform one or more of:
an industrial automation function;
a process control function;
a test and measurement function.

19. A computer-implemented method, comprising:
utilizing a computer to implement:
displaying a first node in a first graphical data flow program, wherein the first graphical data flow program comprises a first plurality of interconnected nodes that visually indicate functionality of the first graphical data flow program;
receiving user input at edit time to configure the first node to reference a second graphical data flow program, wherein the second graphical data flow program comprises a second plurality of interconnected nodes that visually indicate functionality of the second graphical data flow program, and wherein the second graphical data flow program is configured to execute asynchronously with respect to the first graphical data flow program;

statically binding the first node to the second graphical data flow program in response to the user input, wherein said statically binding is performed at edit time; and validating compatibility between the first node and the second graphical data flow program based on said static binding, wherein said validating compatibility is performed at edit time;

wherein during execution of the first graphical data flow program, the first graphical data flow program communicates with the second graphical data flow program via one or more strictly typed input or output parameters.

\* \* \* \* \*